(12) United States Patent
Mou et al.

(10) Patent No.: US 11,879,665 B2
(45) Date of Patent: Jan. 23, 2024

(54) GAS EXCHANGE DEVICE

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Chang-Yen Tsai, Hsinchu (TW); Wei-Ming Lee, Hsinchu (TW); Chin-Wen Hsieh, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 205 days.

(21) Appl. No.: 17/559,880

(22) Filed: Dec. 22, 2021

(65) Prior Publication Data

US 2022/0221172 A1 Jul. 14, 2022

(30) Foreign Application Priority Data

Jan. 12, 2021 (TW) .................................. 110101031

(51) Int. Cl.
*F24F 8/10* (2021.01)
*F24F 8/108* (2021.01)
(Continued)

(52) U.S. Cl.
CPC ................ *F24F 8/108* (2021.01); *F24F 8/15* (2021.01); *F24F 8/20* (2021.01); *F24F 11/58* (2018.01);
(Continued)

(58) Field of Classification Search
CPC ...... F24F 8/108; F24F 8/15; F24F 8/20; F24F 11/58; F24F 13/08; F24F 13/28; F24F 2110/65; B01D 53/72; B01D 2251/108; B01D 2255/104; B01D 2255/802; B01D 2257/302; B01D 2257/404; B01D 2257/50; B01D 2257/502; B01D 2257/504; B01D 2257/7027; B01D 2257/708;
(Continued)

(56) References Cited

FOREIGN PATENT DOCUMENTS

| CN | 104019516 A | 9/2014 |
|---|---|---|
| CN | 205606779 U | 9/2016 |

(Continued)

OTHER PUBLICATIONS

EPO translation of KR101647643 (Year: 2016).*

*Primary Examiner* — Stephen Hobson
(74) *Attorney, Agent, or Firm* — Birch, Stewart, Kolasch & Birch, LLP

(57) ABSTRACT

A gas exchange device for filtering a gas is provided. The gas exchange device includes a gas-intake channel having a gas-intake-channel inlet and a gas-intake-channel outlet, a gas-exhaust channel disposed aside the gas-intake channel and including a gas-exhaust-channel inlet and a gas-exhaust-channel outlet, a purification unit disposed in the gas-intake channel for filtering the gas passing through the gas-intake channel, a gas-intake guider and a gas-exhaust guider for guiding the gas, a driving controller disposed in the gas-intake channel near the gas-intake guider for controlling enablement and disablement of the purification unit, the gas-intake guider and the gas-exhaust guider, and a gas detection main body for detecting the gas and generating detection data.

20 Claims, 18 Drawing Sheets

(51) Int. Cl.
*F24F 13/28* (2006.01)
*F24F 8/20* (2021.01)
*F24F 8/15* (2021.01)
*F24F 11/58* (2018.01)
*F24F 13/08* (2006.01)
*F24F 110/65* (2018.01)

(52) U.S. Cl.
CPC .............. *F24F 13/08* (2013.01); *F24F 13/28* (2013.01); *F24F 2110/65* (2018.01)

(58) Field of Classification Search
CPC ............ B01D 2257/91; B01D 2257/93; B01D 2258/06; B01D 2259/4508; B01D 2259/4591; B01D 2259/804; B01D 2259/818; B01D 46/50; B01D 53/04; B01D 53/0407; B01D 53/885; B01D 46/0028
See application file for complete search history.

(56) References Cited

FOREIGN PATENT DOCUMENTS

| | | | |
|---|---|---|---|
| CN | 106765846 | A | 5/2017 |
| CN | 207963042 | U | 10/2018 |
| CN | 110018091 | A | 7/2019 |
| CN | 209877279 | U | 12/2019 |
| CN | 212253050 | U | 12/2020 |
| KR | 101647643 | * | 8/2016 |
| TW | 537391 | U | 6/2003 |
| TW | I509204 | B | 11/2015 |
| TW | I542838 | B | 7/2016 |
| TW | 1583434 | B | 5/2017 |
| TW | M561765 | U | 6/2018 |

* cited by examiner

GAS EXCHANGE DEVICE

FIELD OF THE INVENTION

The present disclosure relates to a gas exchange device, and more particularly to a gas exchange device applied to filter a gas and equipped with functions of gas detection, gas purification and cleaning the gas in an activity space.

BACKGROUND OF THE INVENTION

In recent years, people pay more and more attention to the air quality around our daily lives. Particulate matter (PM), such as $PM_1$, $PM_{2.5}$, $PM_{10}$, carbon dioxide, total volatile organic compounds (TVOC), formaldehyde and even the suspended particles, the aerosols, the bacteria, the viruses, etc. contained in the air are all exposed in the environment and might affect the human health, and even endanger the life seriously. It is worth noting that the air quality in the activity space has gradually attracted people's attention. Therefore, providing a gas exchange device capable of purifying and improving the air quality to prevent from breathing harmful gases in the activity space, monitoring the air quality in the activity space in real time, and purifying the air in the activity space quickly when the air quality is poor is an issue of concern developed in the present disclosure.

SUMMARY OF THE INVENTION

An object of the present disclosure is to provide a gas exchange device for filtering a gas. The gas exchange device includes a gas-intake channel having a gas-intake-channel inlet and a gas-intake-channel outlet; a gas-exhaust channel disposed at one side the gas-intake channel and including a gas-exhaust-channel inlet and a gas-exhaust-channel outlet; a purification unit disposed in the gas-intake channel for filtering the gas passing through the gas-intake channel; a gas-intake guider disposed between the gas-intake-channel inlet and the purification unit for guiding and transporting the gas from the gas-intake channel inlet to the gas-intake-channel outlet; a gas-exhaust guider disposed in the gas-exhaust channel near the gas-exhaust-channel outlet for guiding and transporting the gas from the gas-exhaust-channel inlet to the gas-exhaust-channel outlet; a driving controller disposed in the gas-intake channel near the gas-intake guider for controlling the enablement and disablement of the purification unit, the gas-intake guider and the gas-exhaust guider; and a gas detection main body disposed in the gas-intake channel near the gas-intake-channel inlet for detecting the gas introduced through the gas-intake-channel inlet and generating detection data.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
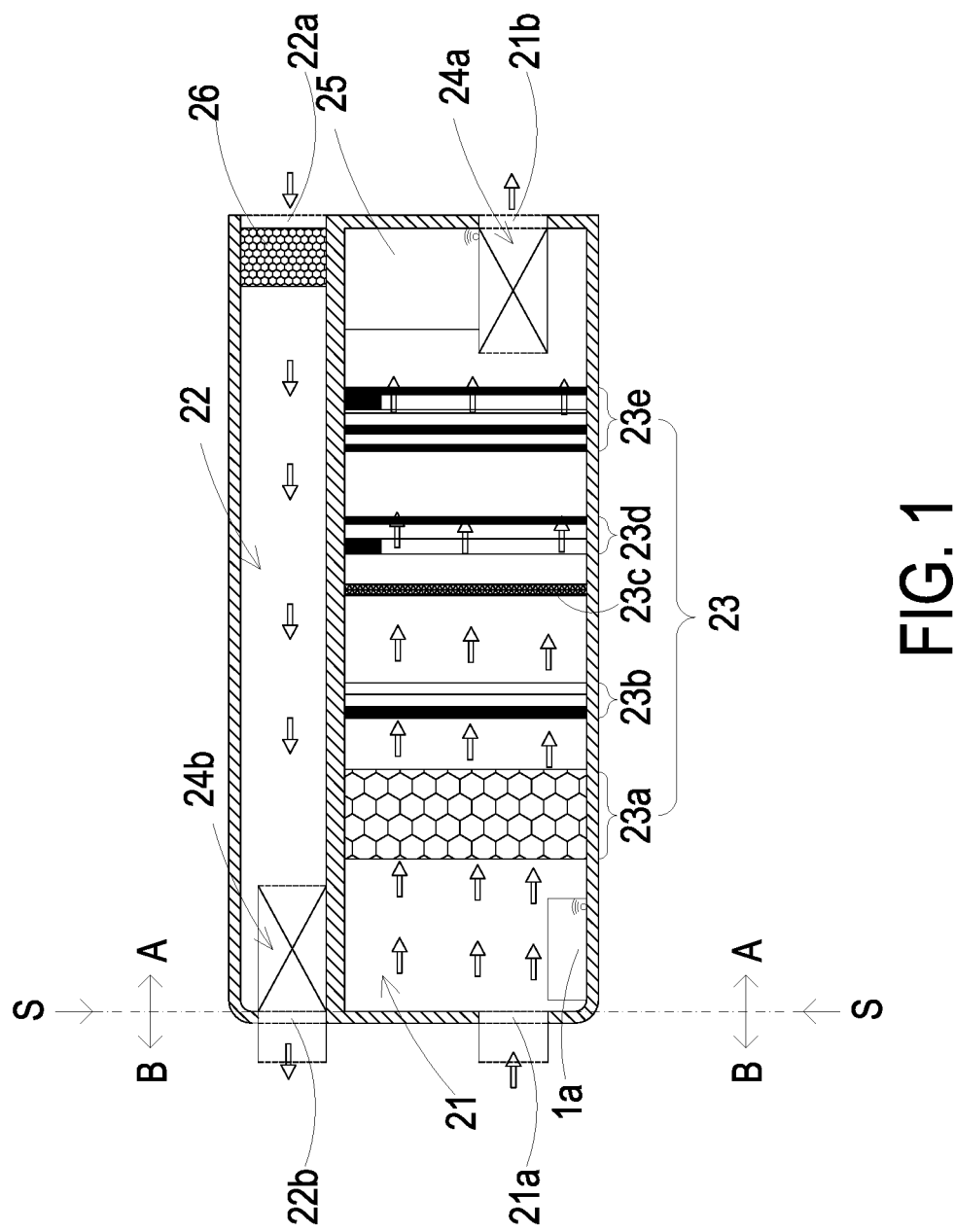
FIG. 1 is a schematic view illustrating a gas exchange device according to an embodiment of the present disclosure.

Please refer to FIG. 1. The present disclosure provides a gas exchange device 2 for filtering a gas including a gas-intake channel 21, a gas-exhaust channel 22, a purification unit 23, a gas-intake guider 24a, a gas-exhaust guider 24b, a driving controller 25 and a gas detection main body 1a. In an embodiment, the gas-intake channel 21 includes a gas-intake-channel inlet 21a and a gas-intake-channel outlet 21b. The gas-exhaust channel 22 is disposed at one side of the gas-intake channel 21 and includes a gas-exhaust-channel inlet 22a and a gas-exhaust-channel outlet 22b. The purification unit 23 is disposed within the gas-intake channel 21 for filtering the gas passing through the gas-intake channel 21. The gas-intake guider 24a is disposed between the gas-intake-channel outlet 21b and the purification unit 23 for guiding and transporting the gas from the gas-intake-channel inlet 21a to the gas-intake-channel outlet 21b. The gas-exhaust guider 24b is disposed within the gas-exhaust channel 22 near the gas-exhaust-channel outlet 22b for guiding and transporting the gas from the gas-exhaust-channel inlet 22a to the gas-exhaust-channel outlet 22b. The driving controller 25 is provided for controlling the enablement and the disablement of the purification unit 23, the gas-intake guider 24a and the gas-exhaust guider 24b. The gas detection main body 1a is disposed within the gas-intake channel 21 near the gas-intake-channel inlet 21a for detecting the flow-in gas through the gas-intake-channel inlet 21a and generating detection data. The gas-intake-channel outlet 21b and the gas-exhaust-channel inlet 22a are disposed in the same first space A. The first space A can be any one of an indoor space, an in-car space, a room space and an enclosed space. The gas-intake-channel inlet 21a and the gas-exhaust-channel outlet 22b are disposed in a second space B respectively. The second space B is any one of an outdoor space, a space outside a car, a space outside a room, and an open space.

In an embodiment of the present disclosure, the gas exchange device 2 for filtering a gas includes a gas-intake channel 21, a gas-exhaust channel 22, a purification unit 23, a gas-intake guider 24a, a gas-exhaust guider 24b, a driving controller 25 and a gas detection main body 1a. The gas-intake channel 21 includes a gas-intake-channel inlet 21a and a gas-intake-channel outlet 21b. The gas-intake-channel inlet 21a is disposed in a second space B and the gas-intake-channel outlet 21b is disposed in a first space A. The gas-exhaust channel 22 is disposed at one side of the gas-intake channel 21 and includes a gas-exhaust-channel inlet 22a and a gas-exhaust-channel outlet 22b. The gas-exhaust-channel inlet 22a is disposed in the first space A and the gas-exhaust-channel outlet 22b is disposed in the second space B. The first space A and the second space B are comparted by a space boundary S-S. Notably, the gas-intake channel 21 and the gas-exhaust channel 22 are illustrated in FIG. 1 in the relationship of upper and lower, but the present disclosure is not limited thereto. The gas-intake channel 21 and the gas-exhaust channel 22 also can be arranged to be closely adjacent to each other or separated from each other, as long as the gas-intake-channel outlet 21b of the gas-intake channel 21 and the gas-exhaust-channel inlet 22a of the gas-exhaust channel 22 are disposed in the same space (the first space A, namely the activity space). The gas-intake-channel outlet 21b and the gas-exhaust-channel inlet 22a are disposed in the same first space A, which is anyone of an indoor space, a car space, a room space and an enclosed space. The gas-intake-channel inlet 21a and the gas-exhaust-channel outlet 22b are respectively disposed in the same second space B, which is any one of an outdoor space, a space outside a car, a space outside a room, and an open space. The gas exchange device 2 is disposed between the first space A and the second space B. Take a room as an example, in which the first space A is the room space and also the activity space, and the second space B is the space outside the room. The gas-intake-channel outlet 21b of the gas-intake channel 21 and the gas-exhaust-channel inlet 22a of the gas-exhaust channel 22 are both disposed in the room space, and the gas-intake-channel inlet 21a of the gas-intake channel 21 and the gas-exhaust-channel outlet 22b of the gas-exhaust channel 22 are both disposed in the space outside the room.

Notably, the gas-intake-channel inlet 21a of the gas-intake channel 21 and the gas-exhaust-channel outlet 22b of the gas-exhaust channel 22 also can be disposed in different second spaces B. Take a room as example, in which the first space A is the room space and the second space B is the space outside the room or an open space. The gas-intake-channel outlet 21b of the gas-intake channel 21 and the gas-exhaust-channel inlet 22a of the gas-exhaust channel 22 are both disposed in the room space (the first space A, namely the activity space). The gas-intake-channel inlet 21a of the gas-intake channel 21 is disposed in the space outside the room (the second space B), but the gas-exhaust-channel outlet 22b of the gas-exhaust channel 22 is disposed in the open space (the second space B). The gas is introduced into the gas-intake channel 21 through the gas-intake-channel inlet 21a from the space outside the room (where is outside the room but inside the house, namely the second space B), guided to the room space (the first space A, namely the activity space) through the gas-intake-channel outlet 21b, guided into the gas-exhaust channel 22 through the gas-exhaust-channel inlet 22a, and then discharged to the open space (where is outside the house, the second space B) through the gas-exhaust-channel outlet 22b, but not limited thereto. The second space B for disposing the gas-intake-channel inlet 21a and the gas-exhaust-channel outlet 22b can be adjusted depending on the practical demands.

The purification unit 23, disposed in the gas-intake channel 21, is used for filtering the gas passing through the gas-intake channel 21. The purification unit 23 includes a first high efficiency particulate air filter screen 23a. The first high efficiency particulate air filter screen 23a is coated with a cleansing factor containing chlorine dioxide to inhibit viruses and bacteria in the gas. The first high efficiency particulate air filter screen 23a is coated with an herbal protective layer extracted from ginkgo and Japanese *Rhus chinensis* to form an herbal protective anti-allergic filter, so as to resist allergy effectively and destroy a surface protein of influenza virus. The first high efficiency particulate air filter screen 23a is coated with a silver ion to inhibit viruses and bacteria in the gas. The purification unit 23 includes a photo-catalyst unit 23b combined with the first high efficiency particulate air filter screen 23a. The purification unit 23 includes a photo-plasma unit 23c combined with the first high efficiency particulate air filter screen 23a. The purification unit 23 includes a negative ionizer 23d combined with the first high efficiency particulate air filter screen 23a. The purification unit 23 includes a plasma ion unit 23e combined with the first high efficiency particulate air filter screen 23a. The purification unit 23 is able to reduce the value of particulate matter ($PM_{2.5}$) to less than 10 $\mu g/m^3$ in the first space A. The purification unit 23 is able to reduce the content of carbon monoxide (CO) to less than 35 ppm in the first space A. The purification unit 23 is able to reduce the content of carbon dioxide ($CO_2$) to less than 1000 ppm in the first space A. The purification unit 23 is able to reduce the content of ozone ($O_3$) to less than 0.12 ppm in the first space A. The purification unit 23 is able to reduce the content of sulfur dioxide ($SO_2$) to less than 0.075 ppm in the first space A. The purification unit 23 is able to reduce the content of nitrogen dioxide ($NO_2$) to less than 0.1 ppm in the first space A. The purification unit 23 is able to reduce the value of lead (Pb) to less than 0.15 $\mu g/m^3$ in the first space A. The purification unit 23 is able to reduce the content of total volatile organic compounds (TVOC) to less than 0.56 ppm in the first space A. The purification unit 23 is able to reduce the content of formaldehyde (HCHO) to less than 0.08 ppm in the first space A. The purification unit 23 is able to reduce the amount of bacteria to less than 1500 $CFU/m^3$ in the first space A. The purification unit 23 is able to reduce the amount of fungi to less than 1000 $CFU/m^3$ in the first space A.

The above-mentioned purification unit 23 disposed in the gas-intake channel 21 can be implemented in the combination of various embodiments. For example, the purification unit 23 includes a first high efficiency particulate air (HEPA) filter screen 23a. When the gas is introduced into the gas-intake channel 21 by the gas-intake guider 24a, the gas is filtered through the first high efficiency particulate air filter screen 23*a* to adsorb the chemical smoke, bacteria, dust particles and pollen contained in the gas to achieve the effects of filtering and purifying the gas introduced into the gas exchange device 2. In some embodiments, the first high efficiency particulate air filter screen 23*a* is coated with a cleansing factor containing chlorine dioxide to inhibit viruses and bacteria contained in the gas introduced by the gas exchange device 2. In the embodiment, the first high efficiency particulate air filter screen 23*a* is coated with a cleansing factor containing chlorine dioxide to inhibit viruses, bacteria, influenza A virus, influenza B virus, enterovirus or norovirus in the gas outside the gas exchange device 2. The inhibition rate can reach more than 99%. It is helpful of reducing the cross-infection of viruses. In other embodiments, the first high efficiency particulate air filter screen 23*a* is coated with an herbal protective layer extracted from ginkgo and Japanese *Rhus chinensis* to form an herbal protective anti-allergic filter, so as to resist allergy effectively and destroy a surface protein of influenza virus, such as H1N1 influenza virus, in the gas introduced by the gas exchange device 2 and passing through the first high efficiency particulate air filter screen 23*a*. In some other embodiments, the first high efficiency particulate air filter screen 23*a* is coated with a silver ion to inhibit viruses and bacteria contained in the gas introduced from the outside of the gas exchange device 2.

In an embodiment, the purification unit 23 includes a photo-catalyst unit 23*b* combined with the first high efficiency particulate air filter screen 23*a*. The photo-catalyst unit 23*b* includes a photo-catalyst and an ultraviolet lamp. The photo-catalyst is irradiated with the ultraviolet lamp to decompose the gas introduced by the gas exchange device 2 for filtering and purifying the gas. In the embodiment, the photo-catalyst and the ultraviolet lamp are disposed in the gas-intake channel 21, respectively, and spaced apart from each other at a distance. When the gas is introduced from the second space B into the gas-intake channel 21 by the gas-intake guider 24*a* of the gas exchange device 2, the photo-catalyst is irradiated by the ultraviolet lamp to convert light energy into chemical energy, thereby decomposes harmful gases and disinfects bacteria contained in the gas, so as to achieve the effects of filtering and purifying the introduced gas.

In an embodiment, the purification unit 23 includes a photo-plasma unit 23*c* combined with the first high efficiency particulate air filter screen 23*a*. The photo-plasma unit 23*c* includes a nanometer irradiation tube. The gas introduced by the gas exchange device 2 from the second space B is irradiated by the nanometer irradiation tube to decompose volatile organic gases contained in the gas and purify the gas. In the embodiment, the nanometer irradiation tube is disposed in the gas-intake channel 21. When the gas of the second space B is introduced into the gas-intake channel 22 by the gas-intake guider 24*a* of the gas exchange device 2, the gas is irradiated by the nanometer irradiation tube, thereby decomposes oxygen molecules and water molecules contained in the gas into high oxidizing photo-plasma, which is an ion flow capable of destroying organic molecules. In that, volatile formaldehyde, volatile toluene and volatile organic compounds (VOC) contained in the gas are decomposed into water and carbon dioxide, so as to achieve the effects of filtering and purifying the introduced gas.

In an embodiment, the purification unit 23 includes a negative ionizer 23*d* combined with the first high efficiency particulate air filter screen 23*a*. The negative ionizer 23*d* includes at least one electrode wire, at least one dust collecting plate and a boost power supply device. When a high voltage is discharged through the electrode wire, the suspended particles contained in the gas introduced by the gas exchange device 2 from the second space B are attached to the dust collecting plate, so as to filter and purify the gas. In the embodiment, the at least one electrode wire and the at least one dust collecting plate are disposed within the gas-intake channel 21. When the at least one electrode wire is provided with a high voltage by the boost power supply device to discharge, the dust collecting plate carries negative charge. When the gas is introduced into the gas-intake channel 21 from the second space B by the gas-intake guider 24*a* of the gas exchange device 2, the at least one electrode wire discharges to make the suspended particles in the gas carrying positive charge and adhere to the dust collecting plate carrying negative charge, so as to achieve the effects of filtering and purifying the introduced gas.

In an embodiment, the purification unit 23 includes a plasma ion unit 23*e* combined with the first high efficiency particulate air filter screen 23*a*. The plasma ion unit 23*e* includes a first electric-field protection screen, an adhering filter screen, a high-voltage discharge electrode, a second electric-field protection screen and a boost power supply device. The boost power supply device provides a high voltage to the high-voltage discharge electrode to discharge and form a high-voltage plasma column with plasma ion, so that the plasma ion of the high-voltage plasma column decomposes viruses or bacteria contained in the gas introduced by the gas exchange device 2 from the second space B. In the embodiment, the first electric-field protection screen, the adhering filter screen, the high-voltage discharge electrode and the second electric-field protection screen are disposed within the gas-intake channel 21. The adhering filter screen and the high-voltage discharge electrode are located between the first electric-field protection screen and the second electric-field protection screen. As the high-voltage discharge electrode is provided with a high voltage by the boost power supply device to charge, a high-voltage plasma column with plasma ion is formed. When the gas is introduced into the gas-intake channel 21 from the second space B by the gas-intake guider 24*a* of the gas exchange device 2, oxygen molecules and water molecules contained in the gas are decomposed into positive hydrogen ions ($H^+$) and negative oxygen ions ($O^{2-}$) through the plasma ion. The substances attached with water molecules around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced gas and achieve the effects of filtering and purifying the gas.

Notably, the purification unit 23 can only include the first high efficiency particulate air filter screen 23*a*, or includes the first high efficiency particulate air filter screen 23*a* combined with any one of the photo-catalyst unit 23*b*, the photo-plasma unit 23*c*, the negative ionizer 23*d* and the plasma ion unit 23*e*. In an embodiment, the first high efficiency particulate air filter screen 23*a* is combined with any two of the photo-catalyst unit 23*b*, the photo-plasma unit 23*c*, the negative ionizer 23*d* and the plasma ion unit 23*e*. Alternatively, the first high efficiency particulate air filter screen 23*a* is combined with any three of the photo-catalyst unit 23*b*, the photo-plasma unit 23*c*, the negative ionizer 23*d* and the plasma ion unit 23*e*. In one further embodiment, the first high efficiency particulate air filter screen 23*a* is combined with all of the photo-catalyst unit 23b, the photo-plasma unit 23c, the negative ionizer 23d and the plasma ion unit 23e.

In addition, notably, without an increment of new pollutants in the first space A, after purification for a period of time, the purification unit 23 is able to reduce the value of $PM_{2.5}$ to less than 10 μg/m³, the carbon monoxide (CO) content to less than 35 ppm, the carbon dioxide ($CO_2$) content to less than 1000 ppm, the ozone ($O_3$) content to less than 0.12 ppm, the sulfur dioxide ($SO_2$) content to less than 0.075 ppm, the nitrogen dioxide ($NO_2$) content to less than 0.1 ppm, the value of lead (Pb) to less than 0.15 μg/m³, the total volatile organic compounds (TVOC) content to less than 0.56 ppm, the formaldehyde (HCHO) content to less than 0.08 ppm, the amount of bacteria to less than 1500 CFU/m³, and the amount of fungi to less than 1000 CFU/m³, thereby the first space A becomes an activity space with good air quality.

The gas-intake guider 24a is disposed between the gas-intake-channel outlet 21b and the purification unit 23 for guiding and transporting the gas from the gas-intake-channel inlet 21a to the gas-intake-channel outlet 21b. The gas-exhaust guider 24b is disposed within the gas-exhaust channel 22 near the gas-exhaust-channel outlet 22b for guiding and transporting the gas from the gas-exhaust-channel inlet 22a to the gas-exhaust-channel outlet 22b. An exported airflow rate of the gas-intake guider 24a has a range of 200~1600 CADR (Clean Air Output Ration) and the gas is further filtered by the purification unit 23 for providing a cleaner gas. An exported airflow rate of the gas-exhaust guider 24b has a range of 200~1600 CADR (Clean Air Output Ration) for transporting the gas. In an embodiment, the gas-intake guider 24a is an air-conditioner capable of adjusting the temperature and the humidity of the first space A.

Preferably but not exclusively, the exported airflow rate of the gas-intake guider 24a and the gas-exhaust guider 24b of the gas exchange device 2 is 800 CADR (Clean Air Output Ration), but not limited thereto. In some other embodiments, the exported airflow rate of the gas-intake guider 24a and the gas-exhaust guider 24b is ranged between 200 and 1600 CADR (Clean Air Output Ration). In some further embodiments, the respective exported airflow rates of the gas-intake guider 24a and the gas-exhaust guider 24b can be different, and the respective amounts of the gas-intake guider 24a and the gas-exhaust guider 24b can be more than one. Notably, the gas-intake guider 24a is an air-conditioner capable of adjusting the temperature and the humidity of the first space A, but not limited thereto. The gas-intake guider 24a also can have the same function with the gas-exhaust guider 24b.

The gas detection main body 1a is disposed within the gas-intake channel 21 near the gas-intake-channel inlet 21a for detecting the flow-in gas from the gas-intake-channel inlet 21a and generating detection data. The detection data refers to data selected from the group consisting of particulate matter ($PM_1$, $PM_{2.5}$ and $PM_{10}$), carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, virus, temperature, humidity and a combination thereof. Notably, the gas detection main body 1a includes a wireless multiplexing communication module, such as a Wi-Fi module, for wirelessly communicating with the driving controller 25, but not limited thereto. The gas detection main body 1a also can be implemented to execute a wired communication.

The gas detection main body 11 illustrated in FIGS. 2A to 2C, FIGS. 3A to 3B, FIG. 4 and FIGS. 5A to 5B has an identical structure to the gas detection main body 1a. The following descriptions for the gas detection main body 11 are provided for explaining the structure of the gas detection main body 1a.

Please refer to FIG. 1, FIGS. 2A to 2C, FIGS. 3A to 3B, FIG. 4 and FIGS. 5A to 5B. The gas detection main body 11 includes a base 111, a piezoelectric actuator 112, a driving circuit board 113, a laser component 114, a sensor 115 and an outer cover 116. The base 111 includes a first surface 1111, a second surface 1112, a laser loading region 1113, a gas-inlet groove 1114, a gas-guiding-component loading region 1115, and a gas-outlet groove 1116. The second surface 1112 is opposite to the first surface 1111. The laser loading region 1113 is hollowed out from the first surface 1111 to the second surface 1112. The gas-inlet groove 1114 is concavely formed from the second surface 1112 and disposed adjacent to the laser loading region 1113. The gas-inlet groove 1114 includes a gas-inlet 1114a and a transparent window 1114b opened on two lateral walls thereof and in communication with the laser loading region 1113. The gas-guiding-component loading region 1115 is concavely formed from the second surface 1112 and in communication with the gas-inlet groove 1114. The gas-guiding-component loading region 1115 has a ventilation hole 1115a penetrated a bottom surface thereof. The gas-outlet groove 1116 is concavely formed from a region of the first surface 1111 spatially corresponding to the bottom surface of the gas-guiding-component loading region 1115, and hollowed out from the first surface 1111 to the second surface 1112 in a region where the first surface 1111 is misaligned with the gas-guiding-component loading region 1115, wherein the gas-outlet groove 1116 is in communication with the ventilation hole 1115a and includes a gas-outlet 1116a mounted thereon. The piezoelectric actuator 112 is accommodated in the gas-guiding-component loading region 1115. The driving circuit board 113 covers and attaches to the second surface 1112 of the base 111. The laser component 114 is positioned and disposed on the driving circuit board 113 and electrically connected to the driving circuit board 113, and is accommodated in the laser loading region 1113. A light beam path emitted by the laser component 114 passes through the transparent window 1114b and extends in an orthogonal direction perpendicular to the gas-inlet groove 1114. The sensor 115 is positioned and disposed on the driving circuit board 113 and electrically connected to the driving circuit board 113, and is accommodated in the gas-inlet groove 1114 at a region orthogonal to the light beam path projected by the laser component 114. The sensor 115 detects the suspended particles in the gas passing through the gas-inlet groove 1114 and irradiated by the light beam emitted from the laser component 114. The outer cover 116 covers the first surface 1111 of the base 111 and includes a lateral plate 1161. The lateral plate 1161 includes an inlet opening 1161a and an outlet opening 1161b at positions spatially corresponding to the gas-inlet 1114a and the gas-outlet 1116a of the base 111, respectively. The inlet opening 1161a is spatially corresponding to the gas-inlet 1114a of the base 111, and the outlet opening 1161b is spatially corresponding to the gas-outlet 1116a of the base 111. The first surface 1111 of the base 111 is covered by the outer cover 116, and the second surface 1112 of the base 111 is covered by the driving circuit board 113. Thus, the gas-inlet groove 1114 defines an inlet path and the gas-outlet groove 1116 defines an outlet path, thereby the piezoelectric actuator 112 accelerates introducing the gas outside the gas-inlet 1114a of the base 111 into the inlet path defined by the gas-inlet groove 1114 through the inlet opening 1161a, and a concentration of the suspended particles contained in the gas is detected by at least one sensor 115. The gas is guided by the piezoelectric actuator 112 to enter the outlet path defined by the gas-outlet groove 1116 through the ventilation hole 1115a and finally discharged through the gas-outlet 1116a of the base 111 and the outlet opening 1161b.

Please refer to FIGS. 2A to 2C, FIGS. 3A to 3B, FIG. 4 and FIGS. 5A to 5B. The gas detection main body 11 is used to detect the flow-in gas and generate detection data. In the embodiment, the gas detection main body 11 includes a base 111, a piezoelectric actuator 112, a driving circuit board 113, a laser component 114, a sensor 115 and an outer cover 116. The base 111 includes a first surface 1111, a second surface 1112, a laser loading region 1113, a gas-inlet groove 1114, a gas-guiding-component loading region 1115 and a gas-outlet groove 1116. In the embodiment, the first surface 1111 and the second surface 1112 are two surfaces opposite to each other. In the embodiment, the laser loading region 1113 is hollowed out from the first surface 1111 to the second surface 1112. The gas-inlet groove 1114 is concavely formed from the second surface 1112 and disposed adjacent to the laser loading region 1113. The gas-inlet groove 1114 includes a gas-inlet 1114a and two lateral walls. The gas-inlet 1114a is in communication with an environment outside the base 111, and is spatially corresponding in position to an inlet opening 1161a of the outer cover 116. Two transparent windows 1114b are opened on the two lateral walls, respectively, and are in communication with the laser loading region 1113. Therefore, as the first surface 1111 of the base 111 is covered and attached by the outer cover 116, and the second surface 1112 of the base 111 is covered and attached by the driving circuit board 113, the gas-inlet groove 1114, the outer cover 116, and the driving circuit board 113 collaboratively define an inlet path.

In the embodiment, the gas-guiding-component loading region 1115 mentioned above is concavely formed from the second surface 1112 and in communication with the gas-inlet groove 1114. A ventilation hole 1115a penetrates a bottom surface of the gas-guiding-component loading region 1115. In the embodiment, the gas-outlet groove 1116 includes a gas-outlet 1116a, and the gas-outlet 1116a is spatially corresponding to the outlet opening 1161b of the outer cover 116. The gas-outlet groove 1116 includes a first section 1116b and a second section 1116c. The first section 1116b is concavely formed from a region of the first surface 1111 spatially corresponding to a vertical projection area of the gas-guiding-component loading region 1115. The second section 1116c is hollowed out from the first surface 1111 to the second surface 1112 in a region where the first surface 1111 is misaligned with the vertical projection area of the gas-guiding-component loading region 1115 and extended therefrom. The first section 1116b and the second section 1116c are connected to form a stepped structure. Moreover, the first section 1116b of the gas-outlet groove 1116 is in communication with the ventilation hole 1115a of the gas-guiding-component loading region 1115, and the second section 1116c of the gas-outlet groove 1116 is in communication with the gas-exhaust 1116a. In that, when the first surface 1111 of the base 111 is attached and covered by the outer cover 116 and the second surface 1112 of the base 111 is attached and covered by the driving circuit board 113, the gas-outlet groove 1116, the outer cover 116 and the driving circuit board 113 collaboratively define an outlet path.

Figure 2A:
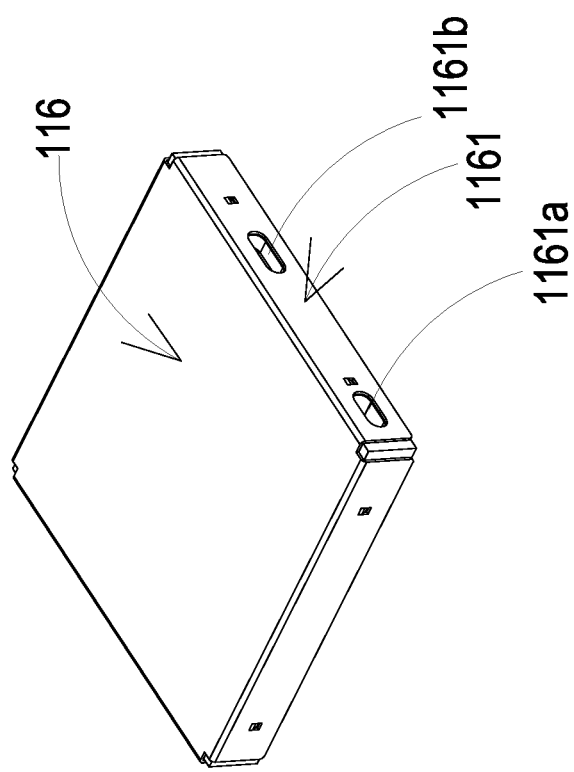
FIG. 2A is a schematic view illustrating a gas detection main body of the gas exchange device according to the embodiment of the present disclosure.
Figure 2B:
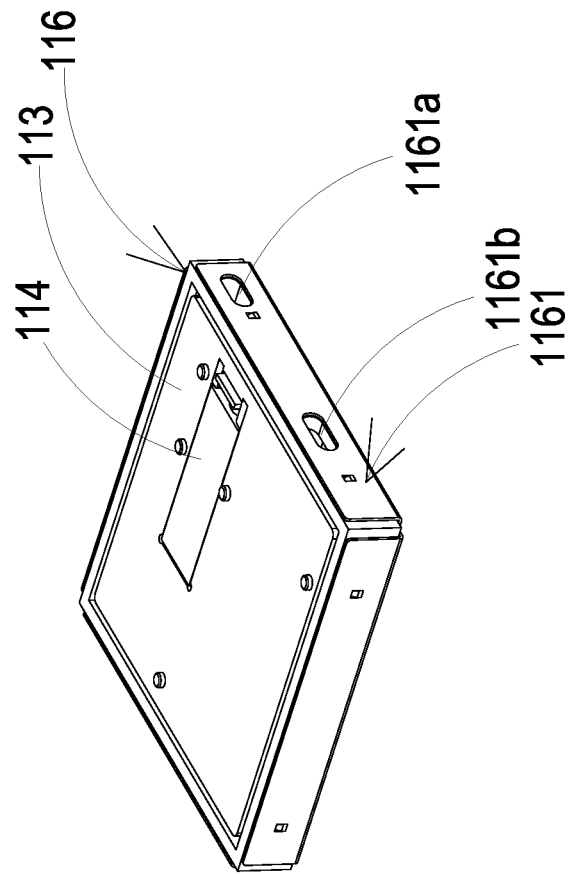
FIG. 2B is a schematic view illustrating the gas detection main body of the gas exchange device according to the embodiment of the present disclosure from another perspective angle.
Figure 2C:
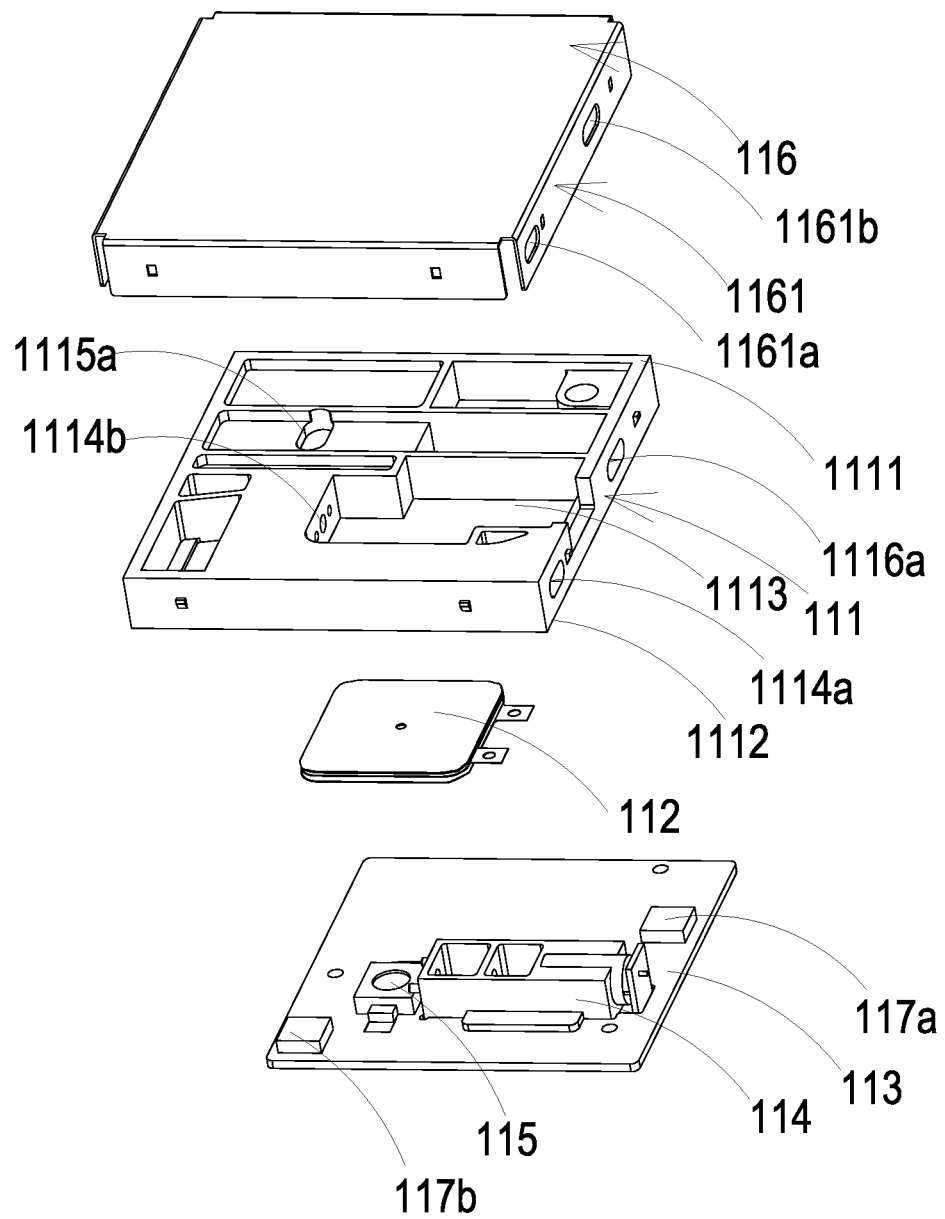
FIG. 2C is an exploded view illustrating the gas detection main body of the gas exchange device according to the embodiment of the present disclosure
Figure 3A:
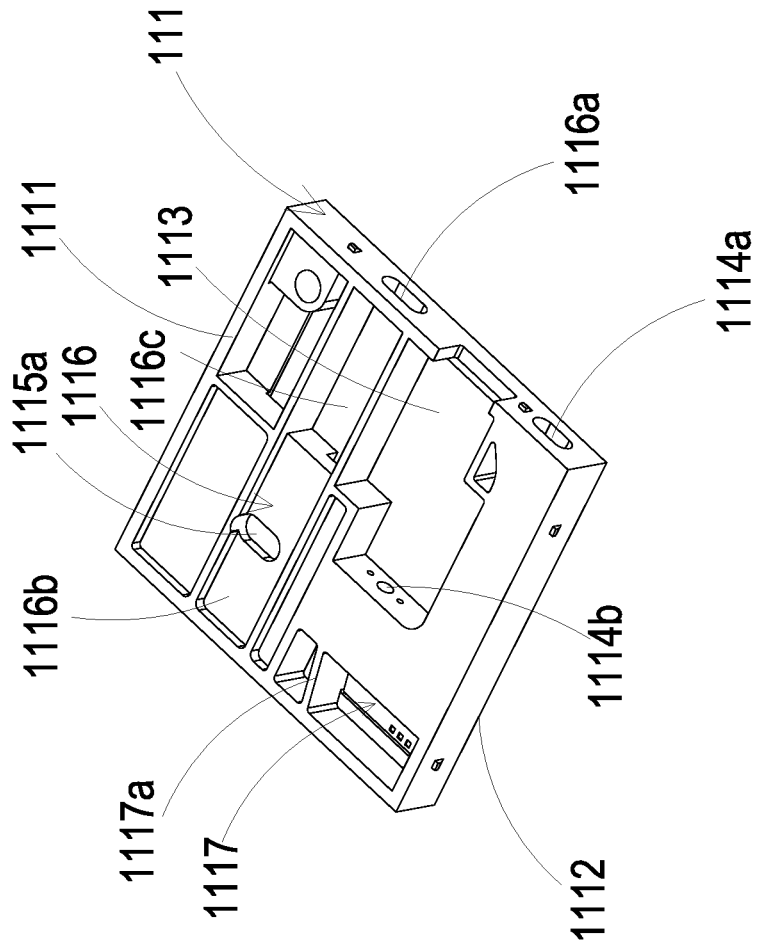
FIG. 3A is a schematic front view illustrating a base of the gas detection main body in FIG. 2C.
Figure 3B:
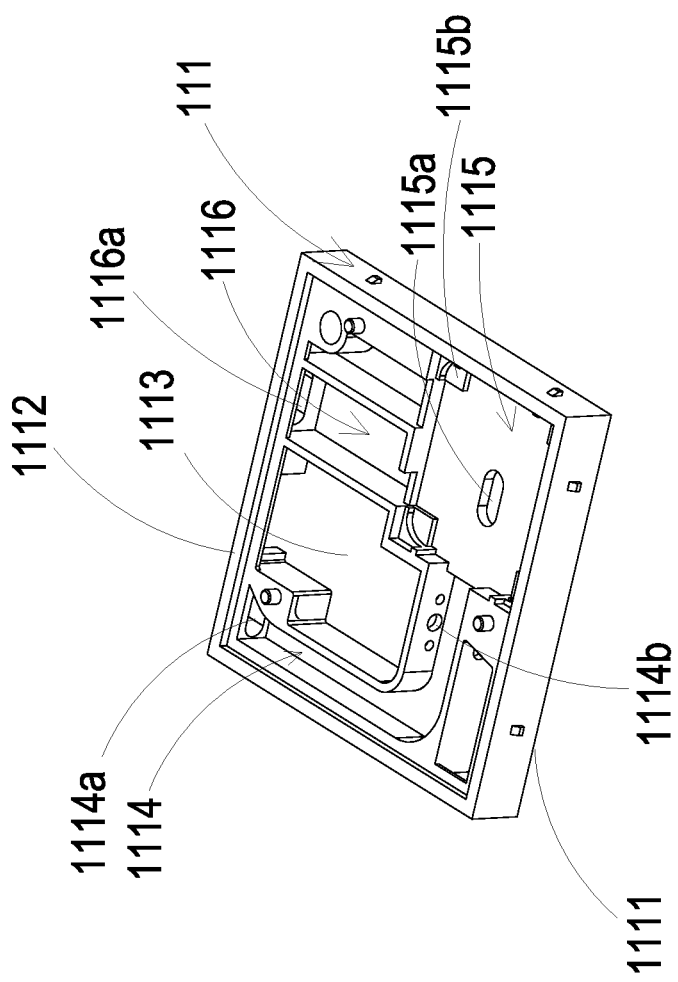
FIG. 3B is a schematic rear view illustrating the base of the gas detection main body in FIG. 2C.
Figure 4:
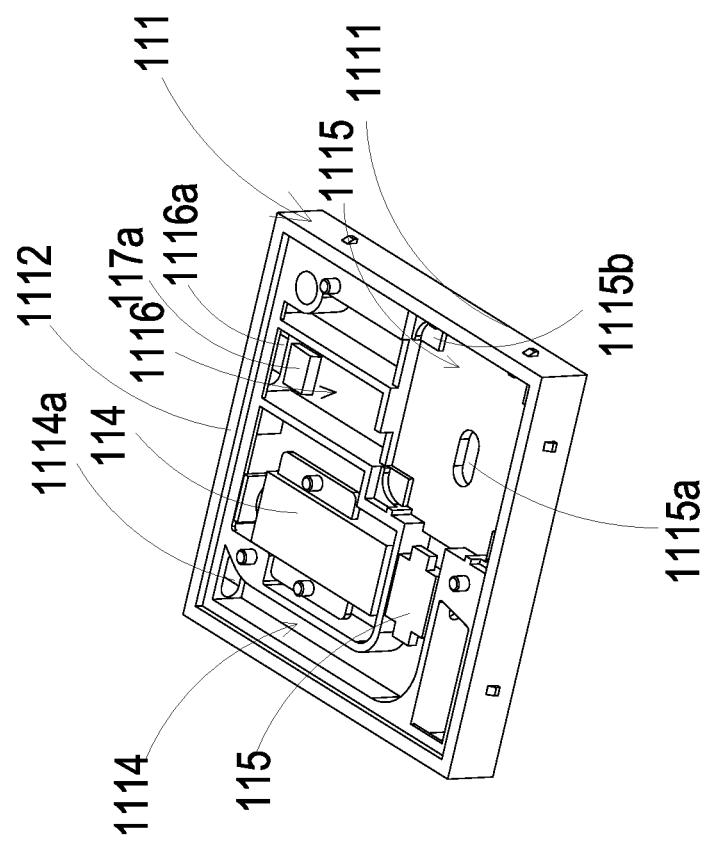
FIG. 4 is a schematic view illustrating a laser component and a sensor received within the base of the gas detection main body in FIG. 2C.

Please refer to FIG. 2C and FIG. 4. In the embodiment, the laser component 114 and the sensor 115 are disposed on the driving circuit board 113 and located within the base 111. In order to clearly describe and illustrate the positions of the laser component 114 and the sensor 115 in the base 111, the driving circuit board 113 is specifically omitted in FIG. 4. The laser component 114 is accommodated in the laser loading region 1113 of the base 111, and the sensor 115 is accommodated in the gas-inlet groove 1114 of the base 111 and is aligned to the laser component 114. In addition, the laser component 114 is spatially corresponding to the transparent window 1114b, thereby a light beam emitted by the laser component 114 passes through the transparent window 1114b and irradiates into the gas-inlet groove 1114. The path of the light beam extends from the laser component 114 and passes through the transparent window 1114b in an orthogonal direction perpendicular to the gas-inlet groove 1114.

In the embodiment, a projecting light beam emitted from the laser component 114 passes through the transparent window 1114b and enters the gas-inlet groove 1114 to irradiate the suspended particles contained in the gas passing through the gas-inlet groove 1114. When the suspended particles contained in the gas are irradiated and generate scattered light spots, the scattered light spots are received and calculated by the sensor 115 for obtaining related information about the sizes and the concentration of the suspended particles contained in the gas. In the embodiment, the sensor 115 is a $PM_{2.5}$ sensor.

In the embodiment, the at least one sensor 115 of the gas detection main body 11 includes a volatile organic compound sensor for detecting and obtaining the gas information of $CO_2$ or TVOC. The at least one sensor 115 of the gas detection main body 11 includes a formaldehyde sensor for detecting and obtaining the gas information of formaldehyde. The at least one sensor 115 of the gas detection main body 11 includes a sensor for detecting and obtaining the gas information of $PM_1$, $PM_{2.5}$ or $PM_{10}$. The at least one sensor 115 of the gas detection main body 11 includes a pathogenic bacteria sensor for detecting and obtaining the gas information of bacteria, fungi or pathogenic bacteria.

The gas detection main body 11 of the present disclosure not only detects the suspended particles in the gas, but also detects the characteristics of the introduced gas. Preferably but not exclusively, the characteristics of the introduced gas that can be detected is selected from the group consisting of formaldehyde, carbon monoxide, carbon dioxide, ozone, sulfur dioxide, nitrogen dioxide, lead, total volatile organic compounds (TVOC), bacteria, fungi, pathogenic bacteria, virus, temperature, humidity and a combination thereof. In the embodiment, the gas detection main body 11 further includes a first volatile-organic-compound sensor 117a. The first volatile-organic-compound sensor 117a positioned and disposed on the driving circuit board 113 is electrically connected to the driving circuit board 113, and is accommodated in the gas-outlet groove 1116, so as to detect the gas flowing through the outlet path of the gas-outlet groove 1116. Thus, the concentration or the characteristics of volatile organic compounds contained in the gas in the outlet path can be detected. Alternatively, in an embodiment, the gas detection main body 11 further includes a second volatile-organic-compound sensor 117b. The second volatile-organic-compound sensor 117b positioned and disposed on the driving circuit board 113 is electrically connected to the driving circuit board 113 and is accommodated in the light trapping region 1117. Thus, the concentration or the characteristics of volatile organic compounds contained in the gas flowing through the inlet path of the gas-inlet groove 1114 and transporting into the light trapping region 1117 through the transparent window 1114b can be detected.

Figure 5A:
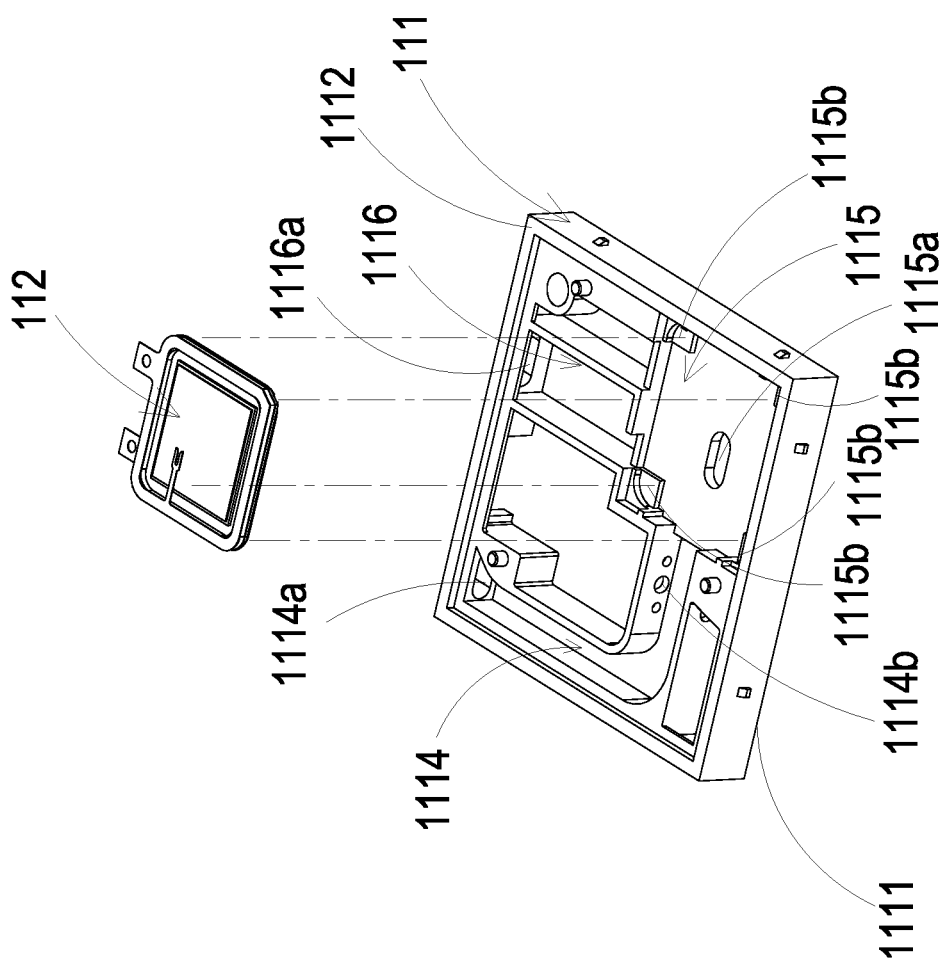
FIG. 5A is a schematic exploded view illustrating the combination of the piezoelectric actuator and the base of the gas detection main body in FIG. 2C.
Figure 5B:
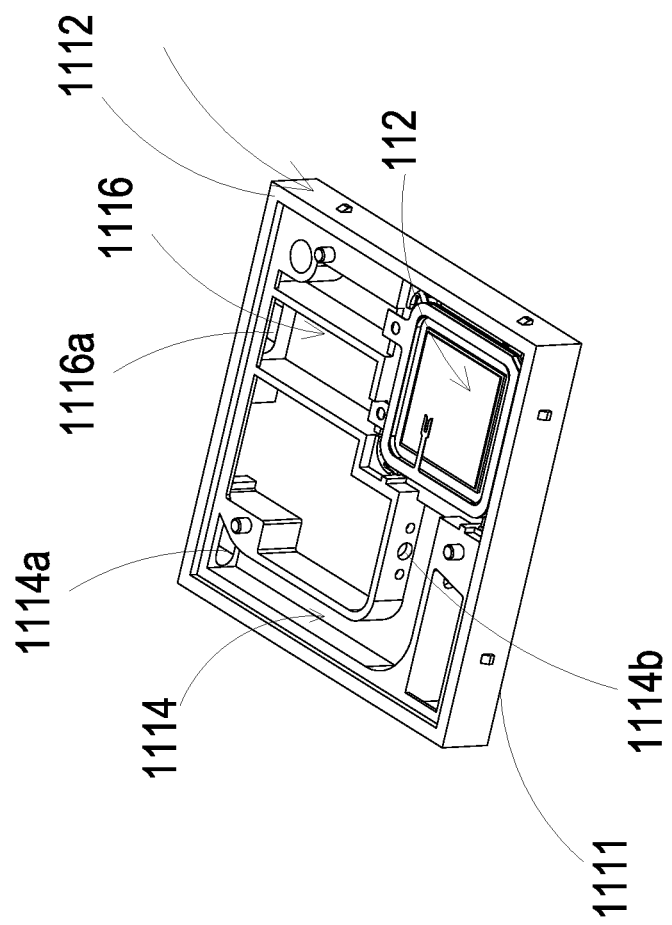
FIG. 5B is a schematic perspective view illustrating the combination of the piezoelectric actuator and the base of the gas detection main body in FIG. 2C.

Please refer to FIG. 5A and FIG. 5B. The piezoelectric actuator 112 is accommodated in the gas-guiding-component loading region 1115 of the base 111. Preferably but not exclusively, the gas-guiding-component loading region 1115 is square-shaped and includes four positioning protrusions 1115b disposed at four corners of the gas-guiding-component loading region 1115, respectively. The piezoelectric actuator 112 is disposed in the gas-guiding-component loading region 1115 through the four positioning protrusions 1115b. In addition, as shown in FIGS. 3A, 3B, 8B and 8C, the gas-guiding-component loading region 1115 is in communication with the gas-inlet groove 1114. When the piezoelectric actuator 112 is enabled, the gas in the gas-inlet groove 1114 is inhaled by the piezoelectric actuator 112, so that the gas flows into the piezoelectric actuator 112, and is transported into the gas-outlet groove 1116 through the ventilation hole 1115a of the gas-guiding-component loading region 1115.

Figure 8A:
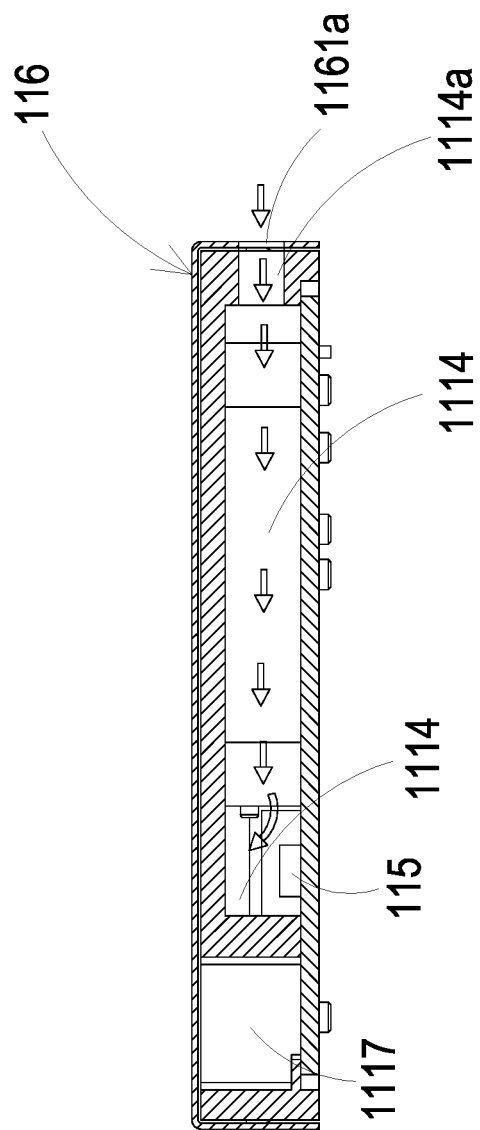
FIGS. 8A to 8C schematically illustrate gas flowing paths of the gas detection main body in FIG. 2B from different angles.
Figure 8B:
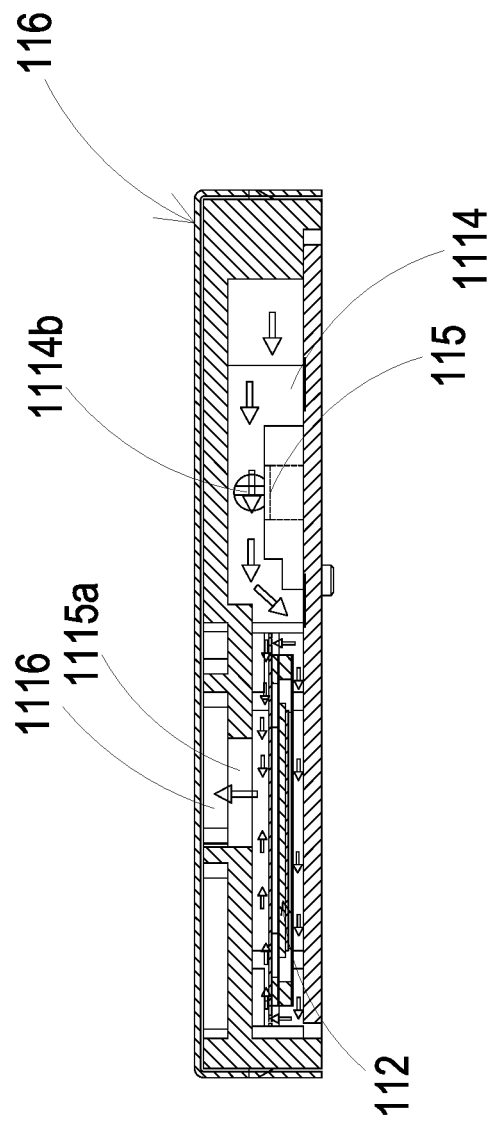
Figure 8C:
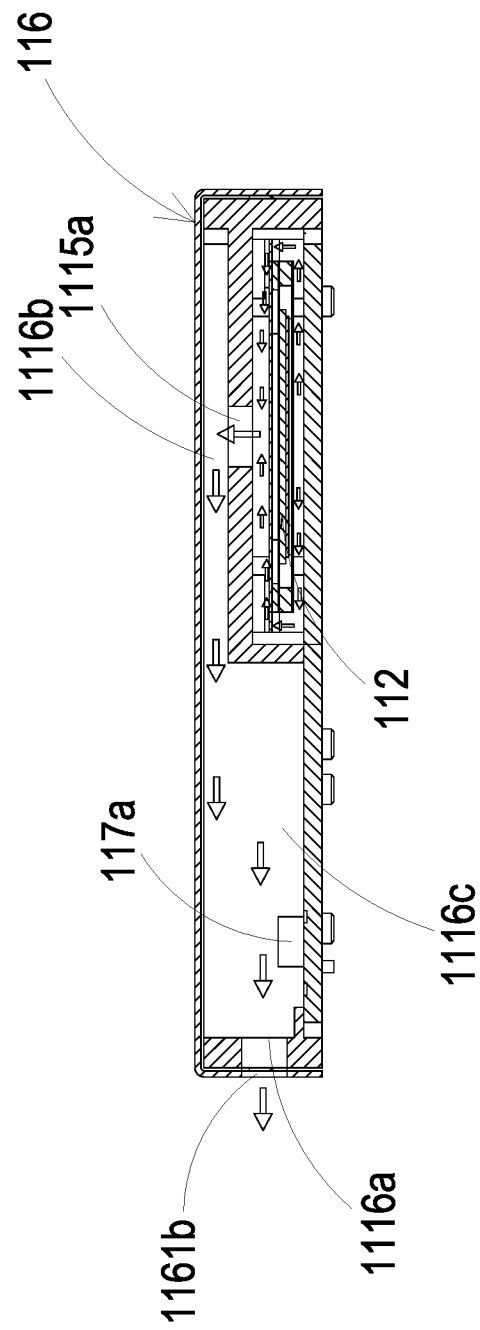

Please refer to FIGS. 2B and 2C. In the embodiment, the driving circuit board 113 covers and attaches to the second surface 1112 of the base 111, and the laser component 114 is positioned and disposed on the driving circuit board 113, and is electrically connected to the driving circuit board 113. The sensor 115 is positioned and disposed on the driving circuit board 113, and is electrically connected to the driving circuit board 113. As shown in FIG. 2B, when the outer cover 116 covers the base 111, the inlet opening 1161a is spatially corresponding to the gas-inlet 1114a of the base 111 (as shown in FIG. 8A), and the outlet opening 1161b is spatially corresponding to the gas-outlet 1116a of the base 111 (as shown in FIG. 8C).

Please refer to FIGS. 6A to 6B, FIGS. 7A to 7B, FIGS. 8A to 8C and FIG. 9. In the embodiment, the piezoelectric actuator 112 includes a gas-injection plate 1121, a chamber frame 1122, an actuator element 1123, an insulation frame 1124 and a conductive frame 1125. The gas-injection plate 1121 includes a suspension plate 1121a capable of bending and vibrating and a hollow aperture 1121b formed at the center of the suspension plate 1121a. The chamber frame 1122 is carried and stacked on the suspension plate 1121a. The actuator element 1123 is carried and stacked on the chamber frame 1122 and includes a piezoelectric carrying plate 1123a, an adjusting resonance plate 1123b and a piezoelectric plate 1123c. The piezoelectric carrying plate 1123a is carried and stacked on the chamber frame 1122, the adjusting resonance plate 1123b is carried and stacked on the piezoelectric carrying plate 1123a, and the piezoelectric plate 1123c is carried and stacked on the adjusting resonance plate 1123b. After receiving a voltage, the piezoelectric carrying plate 1123a and the adjusting resonance plate 1123b can be driven to bend and vibrate in a reciprocating manner. The insulation frame 1124 is carried and stacked on the actuator element 1123. The conductive frame 1125 is carried and stacked on the insulation frame 1124. In the embodiment, the bottom of the gas-injection plate 1121 is fixed on the gas-guiding-component loading region 1115, so that a vacant space 1121c surrounding the gas-injection plate 1121 is defined for flowing the gas therethrough, and a flowing chamber 1127 is formed between the gas-injection plate 1121 and the bottom surface of the gas-guiding-component loading region 1115. A resonance chamber 1126 is collaboratively defined by the actuator element 1123, the chamber frame 1122 and the suspension plate 1121a. Through driving the actuator element 1123 to drive the gas-injection plate 1121 to resonate, the suspension plate 1121a of the gas-injection plate 1121 generates vibration and displacement in a reciprocating manner, so as to inhale the gas into the flowing chamber 1127 through the vacant space 1121c and then eject out for completing a gas flow transmission. The gas detection main body 11 further includes at least one first volatile-organic-compound sensor 117a. The first volatile-organic-compound sensor 117a is positioned and disposed on the driving circuit board 113 and electrically connected to the driving circuit board 113, and is accommodated in the gas-outlet groove 1116, so as to detect the gas guided through the outlet path.

Figure 6A:
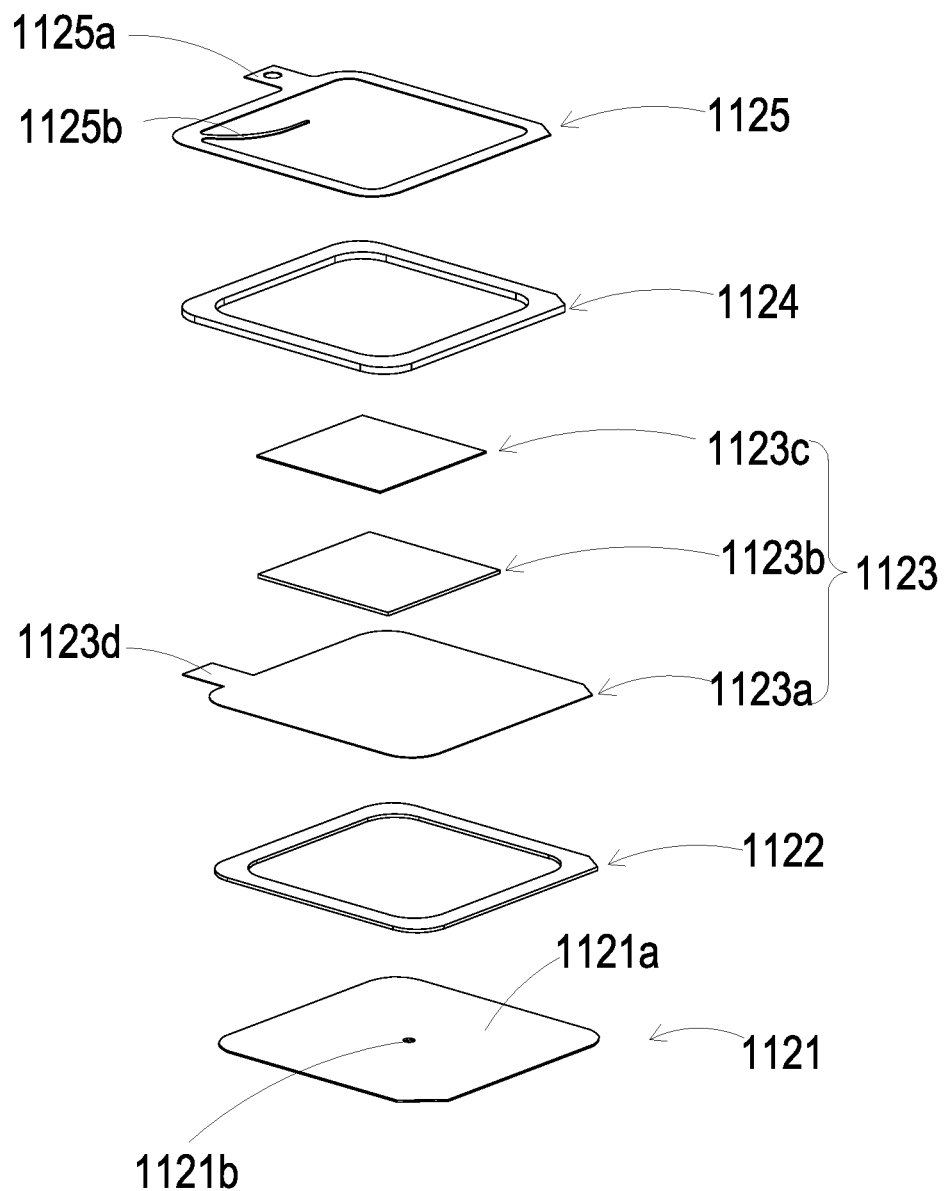
FIG. 6A is a schematic exploded front view illustrating the piezoelectric actuator of the gas detection main body in FIG. 2C.
Figure 6B:
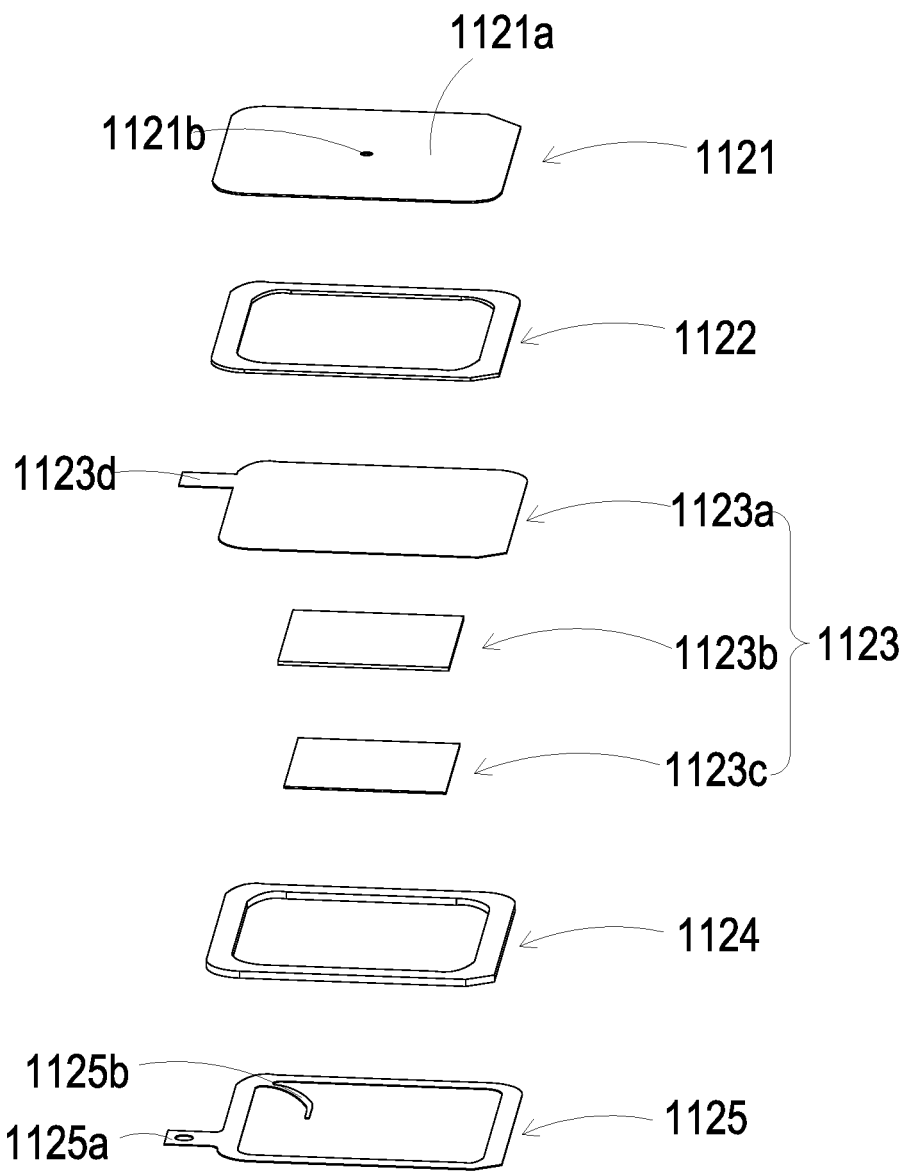
FIG. 6B is a schematic exploded rear view illustrating the piezoelectric actuator of the gas detection main body in FIG. 2C.

Please refer to FIGS. 6A and 6B. In the embodiment, the piezoelectric actuator 112 includes a gas-injection plate 1121, a chamber frame 1122, an actuator element 1123, an insulation frame 1124 and a conductive frame 1125. In the embodiment, the gas-injection plate 1121 is made by a flexible material and includes a suspension plate 1121a and a hollow aperture 1121b. The suspension plate 1121a is a sheet structure and is permitted to undergo a bending deformation. Preferably but not exclusively, the shape and the size of the suspension plate 1121a are corresponding to the inner edge of the gas-guiding-component loading region 1115, but not limited thereto. The shape of the suspension plate 1121a is selected from the group consisting of a square, a circle, an ellipse, a triangle and a polygon. The hollow aperture 1121b passes through a center of the suspension plate 1121a, so as to allow the gas to flow therethrough.

Figure 7A:
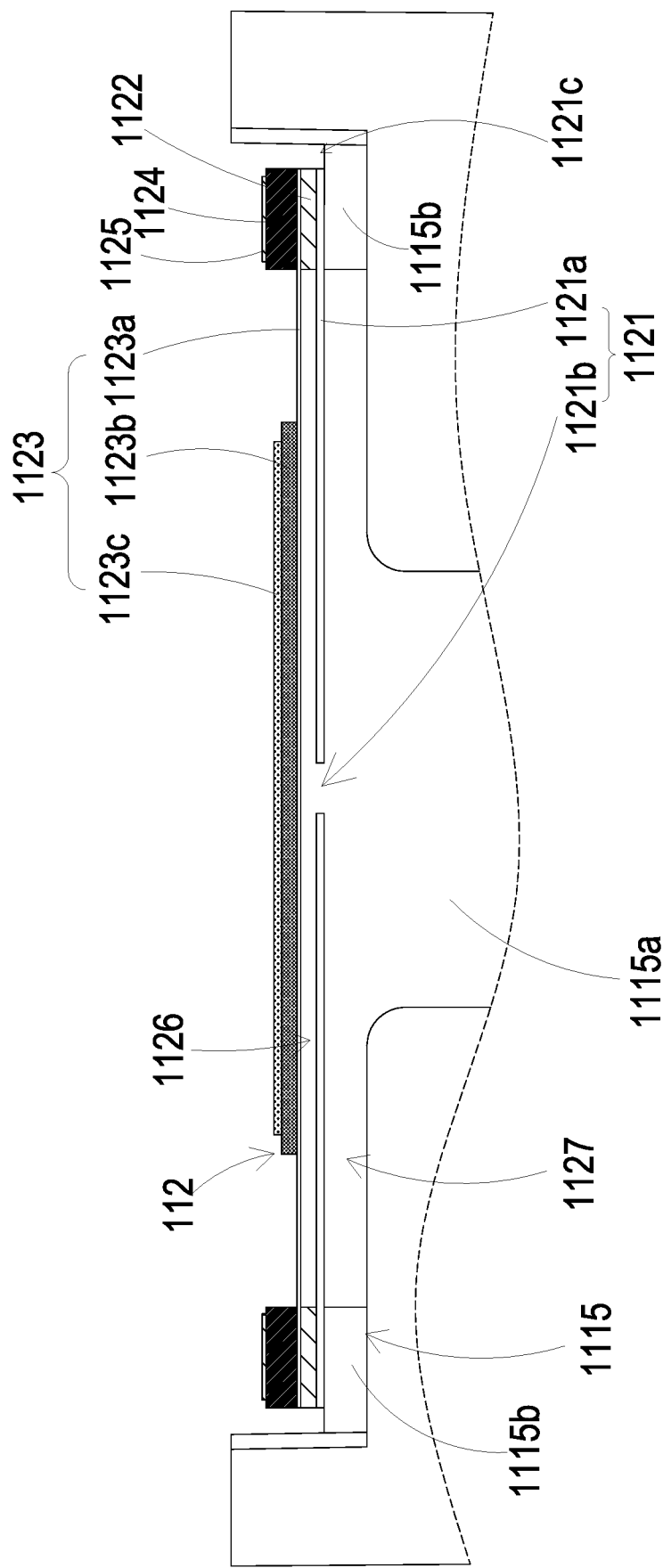
FIG. 7A is a schematic cross-sectional view illustrating the piezoelectric actuator of the gas detection main body in FIG. 6A accommodated in the gas-guiding-component loading region according to the embodiment of the present disclosure.

Please refer to FIG. 6A, FIG. 6B and FIG. 7A. In the embodiment, the chamber frame 1122 is carried and stacked on the gas-injection plate 1121. In addition, the shape of the chamber frame 1122 is corresponding to the gas-injection plate 1121. The actuator element 1123 is carried and stacked on the chamber frame 1122. A resonance chamber 1126 is collaboratively defined by the actuator element 1123, the chamber frame 1122 and the suspension plate 1121a and is formed between the actuator element 1123, the chamber frame 1122 and the suspension plate 1121a. The insulation frame 1124 is carried and stacked on the actuator element 1123 and the appearance of the insulation frame 1124 is similar to that of the chamber frame 1122. The conductive frame 1125 is carried and stacked on the insulation frame 1124, and the appearance of the conductive frame 1125 is similar to that of the insulation frame 1124. In addition, the conductive frame 1125 includes a conducting pin 1125a and a conducting electrode 1125b. The conducting pin 1125a is extended outwardly from an outer edge of the conductive frame 1125, and the conducting electrode 1125b is extended inwardly from an inner edge of the conductive frame 1125. Moreover, the actuator element 1123 further includes a piezoelectric carrying plate 1123a, an adjusting resonance plate 1123b and a piezoelectric plate 1123c. The piezoelectric carrying plate 1123a is carried and stacked on the chamber frame 1122. The adjusting resonance plate 1123b is carried and stacked on the piezoelectric carrying plate 1123a. The piezoelectric plate 1123c is carried and stacked on the adjusting resonance plate 1123b. The adjusting resonance plate 1123b and the piezoelectric plate 1123c are accommodated in the insulation frame 1124. The conducting electrode 1125b of the conductive frame 1125 is electrically connected to the piezoelectric plate 1123c. In the embodiment, the piezoelectric carrying plate 1123a and the adjusting resonance plate 1123b are made by a conductive material. The piezoelectric carrying plate 1123a includes a piezoelectric pin 1123d. The piezoelectric pin 1123d and the conducting pin 1125a are electrically connected to a driving circuit (not shown) of the driving circuit board 113, so as to receive a driving signal, such as a driving frequency and a driving voltage. Through this structure, a circuit is formed by the piezoelectric pin 1123d, the piezoelectric carrying plate 1123a, the adjusting resonance plate 1123b, the piezoelectric plate 1123c, the conducting electrode 1125b, the conductive frame 1125 and the conducting pin 1125a for transmitting the driving signal. Moreover, the insulation frame 1124 provides insulation between the conductive frame 1125 and the actuator element 1123, so as to avoid the occurrence of a short circuit. Thereby, the driving signal is transmitted to the piezoelectric plate 1123c. After receiving the driving signal such as the driving frequency and the driving voltage, the piezoelectric plate 1123c deforms due to the piezoelectric effect, and the piezoelectric carrying plate 1123a and the adjusting resonance plate 1123b are further driven to bend and vibrate in the reciprocating manner.

As described above, the adjusting resonance plate 1123b is located between the piezoelectric plate 1123c and the piezoelectric carrying plate 1123a and served as a cushion between the piezoelectric plate 1123c and the piezoelectric carrying plate 1123a. Thereby, the vibration frequency of the piezoelectric carrying plate 1123a is adjustable. Basically, the thickness of the adjusting resonance plate 1123b is greater than the thickness of the piezoelectric carrying plate 1123a, and the thickness of the adjusting resonance plate 1123b is adjustable, thereby the vibration frequency of the actuator element 1123 can be adjusted accordingly.

Please refer to FIG. 6A, FIG. 6B and FIG. 7A. In the embodiment, the gas-injection plate 1121, the chamber frame 1122, the actuator element 1123, the insulation frame 1124 and the conductive frame 1125 are stacked and positioned in the gas-guiding-component loading region 1115 sequentially, so that the piezoelectric actuator 112 is supported and positioned in the gas-guiding-component loading region 1115. The bottom of the gas-injection plate 1121 is fixed on the four positioning protrusions 1115b of the gas-guiding-component loading region 1115 for supporting and positioning, so that the vacant space 1121c is defined between the suspension plate 1121a of the gas-injection plate 1121 and an inner edge of the gas-guiding-component loading region 1115 for gas flowing therethrough.

Please refer to FIG. 7A. A flowing chamber 1127 is formed between the gas-injection plate 1121 and the bottom surface of the gas-guiding-component loading region 1115. The flowing chamber 1127 is in communication with the resonance chamber 1126 between the actuator element 1123, the chamber frame 1122 and the suspension plate 1121a through the hollow aperture 1121b of the gas-injection plate 1121. By controlling the vibration frequency of the gas in the resonance chamber 1126 to be close to the vibration frequency of the suspension plate 1121a, the Helmholtz resonance effect is generated between the resonance chamber 1126 and the suspension plate 1121a, so as to improve the efficiency of gas transportation.

Figure 7B:
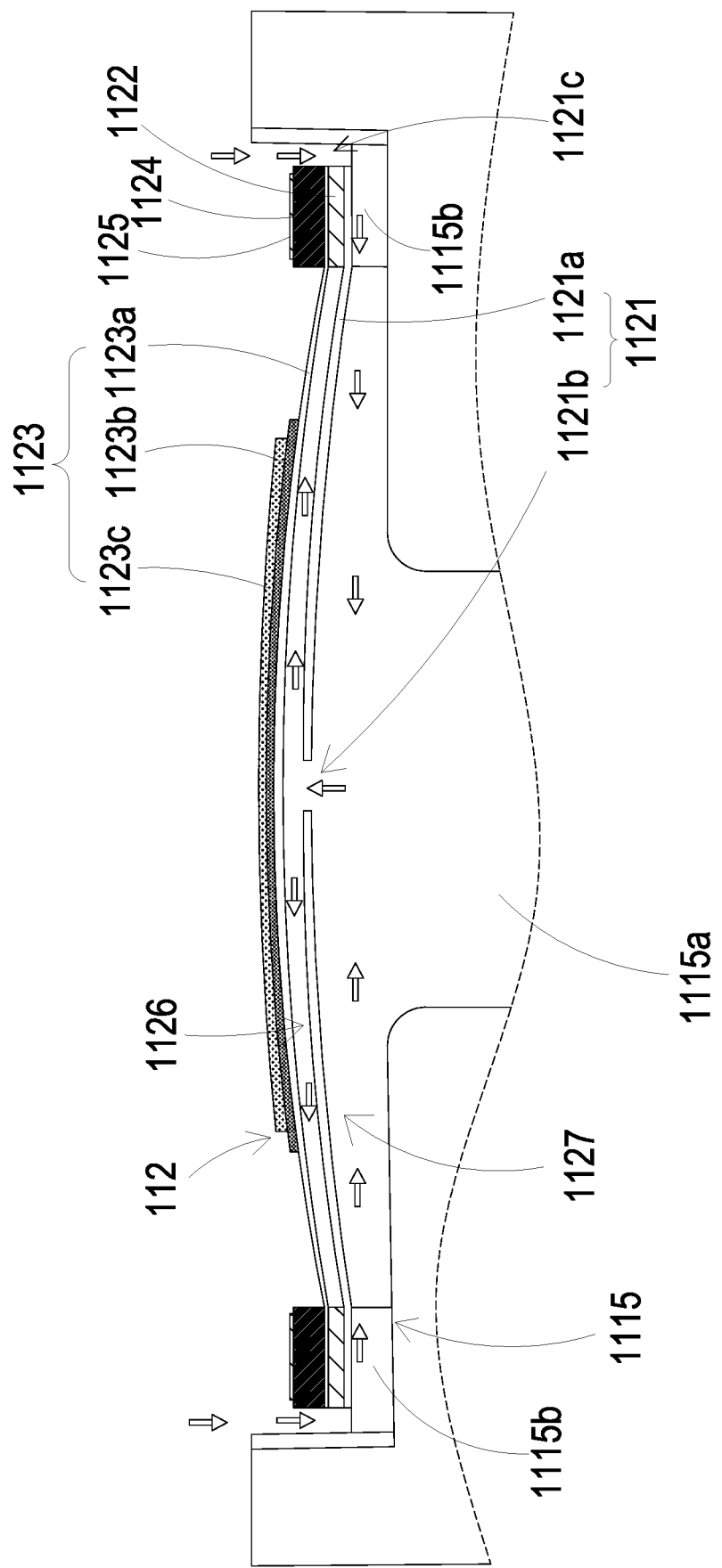
FIGS. 7B and 7C schematically illustrate the operation steps of the piezoelectric actuator of FIG. 7A.
Figure 7C:
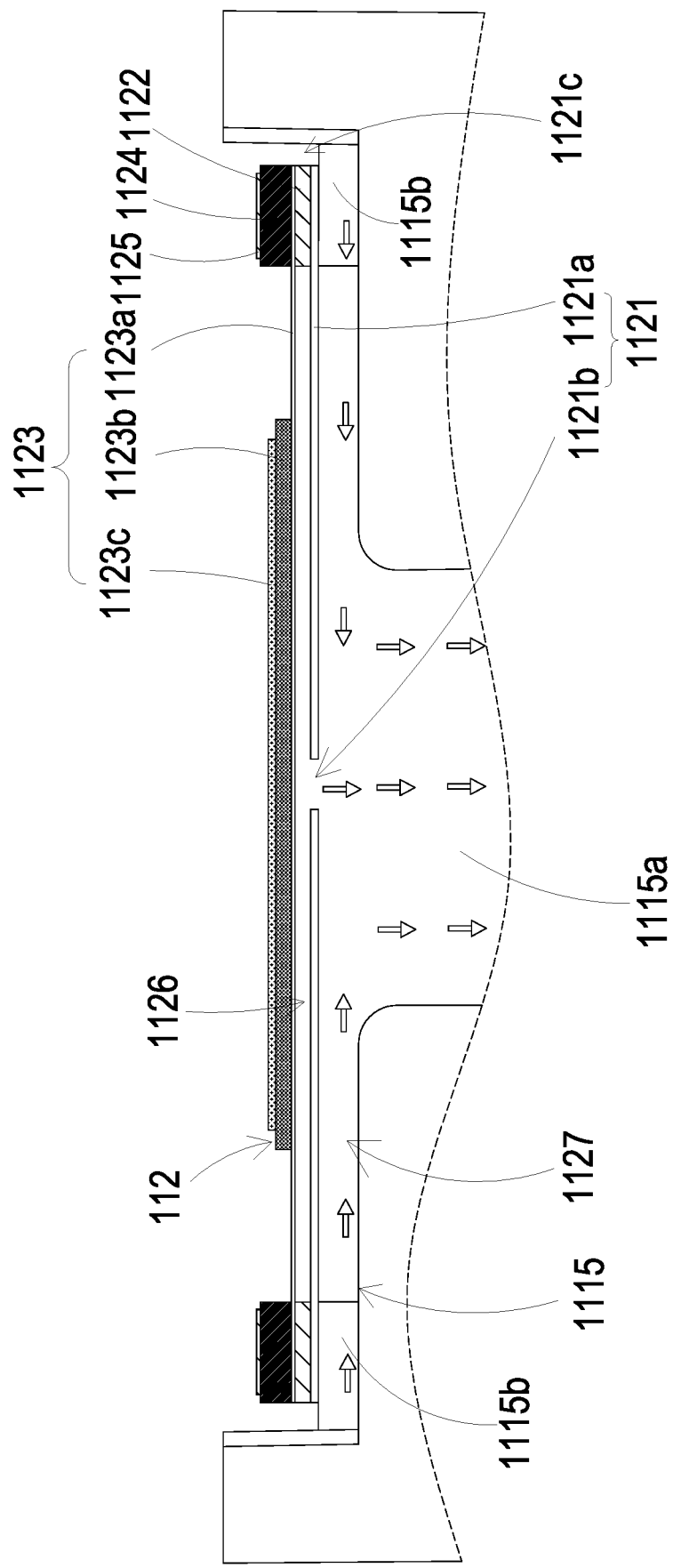

Please refer to FIG. 7B. When the piezoelectric plate 1123c moves away from the bottom surface of the gas-guiding-component loading region 1115, the suspension plate 1121a of the gas-injection plate 1121 is driven to move away from the bottom surface of the gas-guiding-component loading region 1115 by the piezoelectric plate 1123c. In that, the volume of the flowing chamber 1127 is expanded rapidly, the internal pressure of the flowing chamber 1127 is decreased to form a negative pressure, and the gas outside the piezoelectric actuator 112 is inhaled through the vacant space 1121c and enters the resonance chamber 1126 through the hollow aperture 1121b. Consequently, the pressure in the resonance chamber 1126 is increased to generate a pressure gradient. Further as shown in FIG. 7C, when the suspension plate 1121a of the gas-injection plate 1121 is driven by the piezoelectric plate 1123c to move toward the bottom surface of the gas-guiding-component loading region 1115, the gas in the resonance chamber 1126 is discharged out rapidly through the hollow aperture 1121b, and the gas in the flowing chamber 1127 is compressed, thereby the converged gas is quickly and massively ejected out of the flowing chamber 1127 under the condition close to an ideal gas state of the Benulli's law, and transported to the ventilation hole 1115a of the gas-guiding-component loading region 1115. By repeating the above operation steps shown in FIG. 7B and FIG. 7C, the piezoelectric plate 1123c is driven to vibrate in a reciprocating manner. According to the principle of inertia, since the gas pressure inside the resonance chamber 1126 is lower than the equilibrium gas pressure after the converged gas is ejected out, therefore the gas is introduced into the resonance chamber 1126 again. Moreover, the vibration frequency of the gas in the resonance chamber 1126 is controlled to be close to the vibration frequency of the piezoelectric plate 1123c, so as to generate the Helmholtz resonance effect to achieve the gas transportation at high speed and in large quantities.

Furthermore, as shown in FIG. 8A, the gas is inhaled through the inlet opening 1161a of the outer cover 116, flows into the gas-inlet groove 1114 of the base 111 through the gas-inlet 1114a, and is transported to the position of the sensor 115. Further as shown in FIG. 8B, the piezoelectric actuator 112 is enabled continuously to inhale the gas into the inlet path, and facilitate the external gas to be introduced rapidly, flowed stably, and be transported above the sensor 115. At this time, a projecting light beam emitted from the laser component 114 passes through the transparent window 1114b and enters into the gas-inlet groove 1114 to irritate the suspended particles contained in the gas flowing above the sensor 115 in the gas-inlet groove 1114. When the suspended particles contained in the gas are irradiated and generate scattered light spots, the scattered light spots are received and calculated by the sensor 115 for obtaining related information about the sizes and the concentration of the suspended particles contained in the gas. Moreover, the gas above the sensor 115 is continuously driven and transported by the piezoelectric actuator 112, flows into the ventilation hole 1115a of the gas-guiding-component loading region 1115, and is transported to the first section 1116b of the gas-outlet groove 1116. As shown in FIG. 8C, after the gas flows into the first section 1116b of the gas-outlet groove 1116, the gas is continuously transported into the first section 1116b by the piezoelectric actuator 112, and the gas in the first section 1116b is pushed to the second section 1116c. Finally, the gas is discharged out through the gas-outlet 1116a and the outlet opening 1161b.

Figure 9:
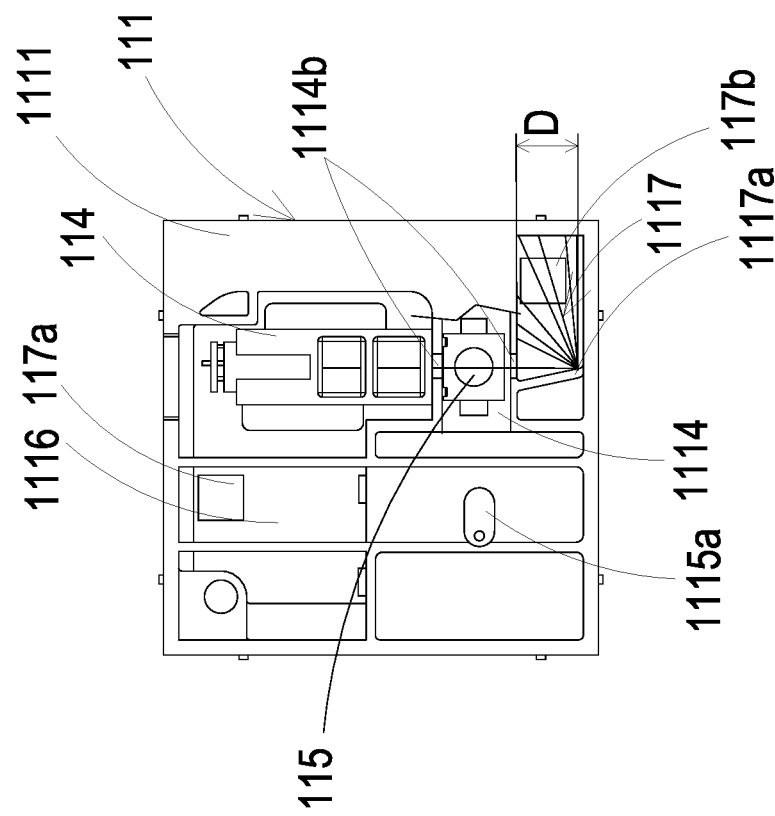
FIG. 9 schematically illustrates a light beam path emitted from the laser component of the gas detection main body in FIG. 2C.

As shown in FIG. 9, the base 111 further includes a light trapping region 1117. The light trapping region 1117 is hollowed out from the first surface 1111 to the second surface 1112 and is spatially corresponding to the laser loading region 1113. In the embodiment, the light beam emitted by the laser component 114 is projected into the light trapping region 1117 through the transparent window 1114b. The light trapping region 1117 includes a light trapping structure 1117a having an oblique cone surface. The light trapping structure 1117a is spatially corresponding to the light beam path extended from the laser component 114. In addition, the projecting light beam emitted from the laser component 114 is reflected into the light trapping region 1117 through the oblique cone surface of the light trapping structure 1117a, so as to prevent the projecting light beam from reflecting back to the position of the sensor 115. In the embodiment, a light trapping distance D is maintained between the transparent window 1114b and a position where the light trapping structure 1117a receives the projecting light beam, so as to avoid the projecting light beam projecting on the light trapping structure 1117a from reflecting back to the position of the sensor 115 directly due to excessive stray light generated after reflection, which results in distortion of detection accuracy.

Please refer to FIG. 2C and FIG. 9. The gas detection main body 11 of the present disclosure not only detects the suspended particles in the gas, but also detects the characteristics of the introduced gas. Preferably but not exclusively, the characteristics of the introduced gas that can be detected is selected from the group consisting of formaldehyde, carbon monoxide, carbon dioxide, ozone, sulfur dioxide, nitrogen dioxide, lead, total volatile organic compounds (TVOC), bacteria, fungi, pathogenic bacteria, virus, temperature, humidity and a combination thereof. In the embodiment, the gas detection main body 11 further includes a first volatile-organic-compound sensor 117a. The first volatile-organic-compound sensor 117a positioned and disposed on the driving circuit board 113 is electrically connected to the driving circuit board 113, and is accommodated in the gas-outlet groove 1116, so as to detect the gas flowing through the outlet path of the gas-outlet groove 1116. Thus, the concentration or the characteristics of volatile organic compounds contained in the gas in the outlet path can be detected. Alternatively, in an embodiment, the gas detection main body 11 further includes a second volatile-organic-compound sensor 117b. The second volatile-organic-compound sensor 117b positioned and disposed on the driving circuit board 113 is electrically connected to the driving circuit board 113 and is accommodated in the light trapping region 1117. Thus, the concentration or the characteristics of volatile organic compounds contained in the gas flowing through the inlet path of the gas-inlet groove 1114 and transporting into the light trapping region 1117 through the transparent window 1114b is detected.

Please refer to FIG. 1. The driving controller 25 is disposed in the gas-intake channel 21 near the gas-intake guider 24a. The driving controller 25 is implemented to control the enablement and the disablement of the purification unit 23, the gas-intake guider 24a and the gas-exhaust guider 24b. The driving controller 25 further includes at least one wireless multiplexing communication module, a processing and computing system, a wired control module and an external transmission module. The wireless multiplexing communication module includes at least one selected from the group consisting of an infrared module, a Wi-Fi module, a Bluetooth module, a radio frequency identification module, a near field communication module and a combination thereof. The wireless multiplexing communication module receives and transmits the detection data through multiplexing technique. The detection data received by the wireless multiplexing communication module is processed and computed by the processing and computing system, so as to automatically adjust the setting values of the exported airflow rate of the gas-intake guider 24a and the setting values of the exported airflow rate of the gas-exhaust guider 24b. The wired control module provides control signals to the purification unit 23, the gas-intake guider 24a, the gas-exhaust guider 24b and the gas detection main body 1a. The control signals include power signals, enabling signals, disabling signals, standby signals, signals for setting, and setting values of the exported airflow rates. The external transmission module executes a communication transmission with an external device via the wireless multiplexing communication module. The external device includes at least one selected from the group consisting of a handheld device, a mobile device, a tablet, a personal computer, a notebook and a combination thereof. The communication transmission includes the transmission of a first detection data, a second detection data and the control signals.

In an embodiment, the driving controller 25 is implemented to control the purification unit 23 and thus control the enablement and disablement of the photo-catalyst unit 23b, the photo-plasma unit 23c, the negative ionizer 23d and the plasma ion unit 23e, but not limited thereto. The driving controller 25 can also control the time of enablement, the reservation time of enablement, and the time of disablement after operation for a period of time or the time of disablement of the photo-catalyst unit 23b, the photo-plasma unit 23c, the negative ionizer 23d and the plasma ion unit 23e, respectively.

In an embodiment, the driving controller 25 is implemented to control the enablement and disablement of the gas-intake guider 24a and the gas-exhaust guider 24b, but not limited thereto. The driving controller 25 can also control the time of enablement, the reservation time of enablement, and the time of disablement after operation for a period of time or the time of disablement of the gas-intake guider 24a and the gas-exhaust guider 24b, respectively. Notably, if the gas-intake guider 24a is an air-conditioner, the driving controller 25 can be further implemented to specify a target temperature or a target humidity for the gas-intake guider 24a. Preferably but not exclusively, a preset target temperature of the gas-intake guider 24a is 24° C. and a preset target humidity of the gas-intake guider 24a is a relative humidity of 50%.

In an embodiment, the driving controller 25 further includes at least one wireless multiplexing communication module. The wireless multiplexing communication module includes at least one selected from the group consisting of an infrared module, a Wi-Fi module, a Bluetooth module, a radio frequency identification module, a near field communication module and a combination thereof. Notably, the infrared module receives the control signal at a corresponding frequency. The Wi-Fi module receives and transmits the control signal or executes the communication transmission of detection data in the same domain through multiplexing technique, and there can have more than one Internet device in the same domain. The Bluetooth module receives and transmits the control signal or executes the communication transmission of detection data from a paired device through multiplexing technique, and there can have more than one device to pair with the Bluetooth module. The radio frequency identification module can be implemented to be, such as a smart card using a 13.56 MHz frequency band, and the complex setting values of the control signal can be pre-written therein, so that the complex operation or setting can be completed through tapping the card. The near field communication module is cooperated with a mobile device with NFC sensor, such as a cellphone, and a corresponding software in the mobile device. After the mobile device is sensed by the radio frequency identification module of the gas exchange device 2, the connection or pairing between the mobile device and the gas exchange device 2 through one or a combination of the wireless multiplexing communication module can be completed instantly, so as to immediately interlink the mobile device and the gas exchange device 2. Preferably but not exclusively, the wireless multiplexing communication module can further include an electronic fence through utilizing the global positioning system (GPS) or adopt a wireless power supply for operation.

The wireless multiplexing communication module receives and transmits the detection data detected by the gas detection main body 1a through multiplexing technique. The detection data received by the wireless multiplexing communication module is processed and computed by the processing and computing system, so as to automatically adjust the setting values of the exported airflow rate of the gas-intake guider 24a and the setting values of the exported airflow rate of the gas-exhaust guider 24b. Notably, although the setting values can be generated automatically by the processing and computing system, the priority of the control signal transmitted from the external device should be higher. For example, assume that the exported airflow rate of the gas-exhaust guider 24b should be 800 clean air output ration after processing and computing, but the gas exchange device 2 has received the setting values from a mobile device via the wireless multiplexing communication module previously which sets the exported airflow rate of the gas-exhaust guider 24b to be 1200 clean air output ration, under such circumstance, the exported airflow rate of the gas-exhaust guider 24b is still remained at 1200 clean air output ration.

The wired control module provides control signals to the purification unit 23, the gas-intake guider 24a, the gas-exhaust guider 24b and the gas detection main body 1a. The control signals include power signals, enabling signals, disabling signals, standby signals, signals for setting, and setting values of the exported airflow rates. Notably, the control signals also can be provided via the wireless multiplexing communication module, and in this circumstance, the gas detection main body 1a is equipped with wireless communication function, such as the Wi-Fi image provided within the gas detection main body 1a shown in FIG. 1.

The external transmission module executes a communication transmission with an external device via the wireless multiplexing communication module. The external device includes at least one selected from the group consisting of a handheld device, a mobile device, a tablet, a personal computer, a notebook and a combination thereof. The communication transmission includes the transmission of a first detection data, a second detection data and the control signals.

Lastly, please refer to FIG. 1. The gas exchange device 2 may further include a second high efficiency particulate air filter screen 26 disposed within the gas-exhaust channel 22 near the gas-exhaust-channel inlet 22a. The second high efficiency particulate air filter screen 26 can filter the gas guided into the gas-exhaust channel 22 by the gas-exhaust guider 24b.

In summary, the gas exchange device of the present disclosure is provided for preventing people from breathing harmful gases in an activity space through supplying a purified gas by gas exchange, monitoring the air quality of the activity space in real time anytime and anywhere, and purifying the air in the activity space instantly when the air quality is poor. The cooperation between the gas detection main body, the purification unit, the gas-intake guider and the gas-exhaust guider allows to provide a specific exported airflow rate for providing a purified gas in the activity space and taking the polluted gas away. The exported airflow rate of the gas-exhaust guider is within a range of 200~1600 CADR (Clean Air Output Ration) which is able to improve the air quality in the activity space.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gas exchange device for filtering a gas, comprising:
a gas-intake channel comprising a gas-intake-channel inlet and a gas-intake-channel outlet;
a gas-exhaust channel disposed at one side of the gas-intake channel and comprising a gas-exhaust-channel inlet and a gas-exhaust-channel outlet;
a purification unit disposed in the gas-intake channel for filtering the gas passing through the gas-intake channel;
a gas-intake guider disposed between the gas-intake-channel inlet and the purification unit for guiding and transporting the gas from the gas-intake channel inlet to the gas-intake-channel outlet;
a gas-exhaust guider disposed in the gas-exhaust channel near the gas-exhaust-channel outlet for guiding and transporting the gas from the gas-exhaust-channel inlet to the gas-exhaust-channel outlet;
a driving controller disposed in the gas-intake channel near the gas-intake guider for controlling enablement and disablement of the purification unit, the gas-intake guider and the gas-exhaust guider; and
a gas detection main body disposed in the gas-intake channel near the gas-intake-channel inlet for detecting the gas introduced through the gas-intake-channel inlet and generating detection data.

2. The gas exchange device according to claim 1, wherein the gas-intake-channel outlet and the gas-exhaust-channel inlet are disposed in a same first space, and wherein the first space is one selected from the group consisting of an indoor space, a car space, a room space, and an enclosed space.

3. The gas exchange device according to claim 2, wherein the gas-intake-channel inlet and the gas-exhaust-channel outlet are respectively disposed in a second space, and wherein the second space is one selected from the group consisting of an outdoor space, a space outside a car, a space outside a room, and an open space.

4. The gas exchange device according to claim 1, wherein the purification unit is a first high efficiency particulate air filter screen.

5. The gas exchange device according to claim 4, wherein the first high efficiency particulate air filter screen is coated with a cleansing factor containing chlorine dioxide to inhibit viruses and bacteria in the gas.

6. The gas exchange device according to claim 4, wherein the first high efficiency particulate air filter screen is coated with an herbal protective layer extracted from ginkgo and Japanese *Rhus chinensis* to form an herbal protective anti-allergic filter, so as to resist allergy effectively and destroy a surface protein of influenza virus in the gas passing through the first high efficiency particulate air filter screen.

7. The gas exchange device according to claim 4, wherein the first high efficiency particulate air filter screen is coated with a silver ion to inhibit viruses and bacteria contained in the gas.

8. The gas exchange device according to claim 4, wherein the purification unit comprises the first high efficiency particulate air filter screen combined with one selected from the group consisting of a photo-catalyst unit, a photo-plasma unit, a negative ionizer, a plasma ion unit and a combination thereof.

9. The gas exchange device according to claim 2, wherein the purification unit reduces the value of $PM_{2.5}$ to less than 10 μg/m³ in the first space.

10. The gas exchange device according to claim 2, wherein the purification unit improves the air quality in the first space to one selected from the group consisting of the content of carbon monoxide to less than 35 ppm, the content of carbon dioxide to less than 1000 ppm, the content of ozone to less than 0.12 ppm, the content of sulfur dioxide to less than 0.075 ppm, the content of nitrogen dioxide to less than 0.1 ppm, the value of lead to less than 0.15 μg/m³, the content of total volatile organic compounds to less than 0.56 ppm, the content of formaldehyde to less than 0.08 ppm and a combination thereof.

11. The gas exchange device according to claim 2, wherein the purification unit reduces one selected from the group consisting of the amount of bacteria to less than 1500 CFU/m³, the amount of fungi to less than 1000 CFU/m³ and a combination thereof in the first space.

12. The gas exchange device according to claim 2, wherein an exported airflow rate of the gas-intake guider is 200~1600 clean air output ration, and the gas is filtered by the purification unit for providing the cleaner gas.

13. The gas exchange device according to claim 12, wherein the gas-intake guider is an air-conditioner capable of adjusting a temperature and a humidity of the first space.

14. The gas exchange device according to claim 1, wherein an exported airflow rate of the gas-exhaust guider is 200~1600 clean air output ration for transporting the gas.

15. The gas exchange device according to claim 1, wherein the driving controller further comprises:
at least one wireless multiplexing communication module selected from the group consisting of an infrared module, a Wi-Fi module, a Bluetooth module, a radio frequency identification module, a near field communication module and a combination thereof, and the wireless multiplexing communication module receiving and transmitting the detection data through multiplexing technique;
a processing and computing system for processing and computing the detection data received by the wireless multiplexing communication module, so as to automatically adjust the setting values of an exported airflow rate of the gas-intake guider and the setting values of an exported airflow rate of the gas-exhaust guider;
a wired control module for providing control signals to the purification unit, the gas-intake guider, the gas-exhaust guider and the gas detection main body, wherein the control signals include power signals, enabling signals, disabling signals, standby signals, signals for setting, and setting values of exported airflow rates; and
an external transmission module for executing a communication transmission with an external device via the wireless multiplexing communication module, wherein the external device comprises one selected from the group consisting of a handheld device, a mobile device, a tablet, a personal computer, a notebook and a combination thereof, and the communication transmission comprises a transmission of the detection data and the control signals.

16. The gas exchange device according to claim 1, further comprising a second high efficiency particulate air filter screen disposed in the gas-exhaust channel near the gas-exhaust-channel inlet for filtering the gas guided into the gas-exhaust channel by the gas-exhaust guider.

17. The gas exchange device according to claim 1, wherein the detection data is one selected from the group consisting of $PM_1$, $PM_{2.5}$, $PM_{10}$, carbon monoxide, carbon dioxide, ozone, sulfur dioxide, nitrogen dioxide, lead, total volatile organic compounds, formaldehyde, bacteria, virus, temperature, humidity and a combination thereof.

18. The gas exchange device according to claim 1, wherein the gas detection main body comprises:
a base comprising:
a first surface;
a second surface opposite to the first surface;
a laser loading region hollowed out from the first surface to the second surface;
a gas-inlet groove concavely formed from the second surface and disposed adjacent to the laser loading region, wherein the gas-inlet groove comprises a gas-inlet and a transparent window opened on two lateral walls thereof and in communication with the laser loading region;
a gas-guiding-component loading region concavely formed from the second surface and in communication with the gas-inlet groove, and having a ventilation hole penetrated a bottom surface thereof; and
a gas-outlet groove concavely formed from a region of the first surface spatially corresponding to the bottom surface of the gas-guiding-component loading region and hollowed out from the first surface to the second surface in a region where the first surface is misaligned with the gas-guiding-component loading region, wherein the gas-outlet groove is in communication with the ventilation hole and comprises a gas-outlet mounted thereon;
a piezoelectric actuator accommodated in the gas-guiding-component loading region;
a driving circuit board covering and attaching to the second surface of the base;
a laser component positioned and disposed on the driving circuit board and electrically connected to the driving circuit board, and accommodated in the laser loading region, wherein a light beam path emitted by the laser component passes through the transparent window and extends in an orthogonal direction perpendicular to the gas-inlet groove;
a sensor positioned and disposed on the driving circuit board and electrically connected to the driving circuit board, and accommodated in the gas-inlet groove at a region in an orthogonal direction perpendicular to the light beam path emitted by the laser component, for detecting suspended particles in the gas passing through the gas-inlet groove and irradiated by a light beam emitted by the laser component; and
an outer cover covering the first surface of the base and comprising a lateral plate, wherein the lateral plate comprises an inlet opening and an outlet opening at positions spatially corresponding to respectively the gas-inlet and the gas-outlet of the base, wherein the inlet opening is spatially corresponding to the gas-inlet of the base and the outlet opening is spatially corresponding to the gas-outlet of the base,
wherein the first surface of the base is covered by the outer cover, and the second surface of the base is covered by the driving circuit board, so as to define an inlet path by the gas-inlet groove and define an outlet path by the gas-outlet groove, thereby the piezoelectric actuator introduces the gas outside the gas-inlet of the base into the inlet path defined by the gas-inlet groove through the inlet opening, and the sensor detects a concentration of the suspended particles contained in the gas, and further the gas is guided by the piezoelectric actuator to enter the outlet path defined by the gas-outlet groove through the ventilation hole and discharged through the gas-outlet of the base and the outlet opening.

19. The gas exchange device according to claim 18, wherein the piezoelectric actuator comprises:
- a gas-injection plate comprising a suspension plate capable of bending and vibrating and a hollow aperture formed at a center of the suspension plate;
- a chamber frame carried and stacked on the suspension plate;
- an actuator element carried and stacked on the chamber frame and comprising a piezoelectric carrying plate, an adjusting resonance plate and a piezoelectric plate, wherein the piezoelectric carrying plate is carried and stacked on the chamber frame, the adjusting resonance plate is carried and stacked on the piezoelectric carrying plate, and the piezoelectric plate is carried and stacked on the adjusting resonance plate, and after receiving a voltage, the piezoelectric carrying plate and the adjusting resonance plate are driven to bend and vibrate in a reciprocating manner;
- an insulation frame carried and stacked on the actuator element; and
- a conductive frame carried and stacked on the insulation frame;
- wherein the gas-injection plate is fixed on the gas-guiding-component loading region, so that a vacant space surrounding the gas-injection plate is defined for flowing the gas therethrough, a flowing chamber is formed between the gas-injection plate and the bottom surface of the gas-guiding-component loading region, and a resonance chamber is collaboratively defined by the actuator element, the chamber frame and the suspension plate, thereby through driving the actuator element to drive the gas-injection plate to resonate, the suspension plate of the gas-injection plate generates vibration and displacement in a reciprocating manner, so as to inhale the gas into the flowing chamber through the vacant space and then eject out for completing a gas flow transmission.

20. The gas exchange device according to claim 18, wherein the piezoelectric actuator further comprises at least a volatile-organic-compound sensor positioned and disposed on the driving circuit board and electrically connected to the driving circuit board, and accommodated in the gas-outlet groove, so as to detect the gas guided through the outlet path.

* * * * *